US007785092B2

(12) United States Patent
Rogers

(10) Patent No.: US 7,785,092 B2
(45) Date of Patent: Aug. 31, 2010

(54) SYSTEMS AND METHODS FOR PRODUCING CONTACT LENSES FROM A POLYMERIZABLE COMPOSITION

(75) Inventor: Richard C. Rogers, Chandler's Ford (GB)

(73) Assignee: CooperVision International Holding Company, LP, St. Michael (BB)

( * ) Notice: Subject to any disclaimer, the term of this patent is extended or adjusted under 35 U.S.C. 154(b) by 992 days.

(21) Appl. No.: 11/200,644

(22) Filed: Aug. 9, 2005

(65) Prior Publication Data
US 2007/0035050 A1 Feb. 15, 2007

(51) Int. Cl.
*B29D 11/00* (2006.01)
(52) U.S. Cl. ............... 425/174.4; 425/408; 425/412; 425/808; 264/1.32; 264/1.38; 264/496; 523/106; 523/107
(58) Field of Classification Search ............ 425/90, 425/100, 140, 174, 174.4, 174.6, 174.8 R, 425/174.8 E, 150, 337, 375, 574, 403, 470, 425/808, 404, 408, 445, 446, 407, 412, 423; 264/1.32, 1.36, 1.38, 2.2, 40.6, 194, 40.7, 264/85, 1.1, 425, 494, 496; 523/106, 107
See application file for complete search history.

(56) References Cited

U.S. PATENT DOCUMENTS

| | | | |
|---|---|---|---|
| 4,592,887 A | | 6/1986 | Bando et al. |
| 4,761,069 A | | 8/1988 | Truong et al. |
| 4,778,372 A | * | 10/1988 | Mutti et al. .......... 425/294 |
| 5,135,685 A | * | 8/1992 | Masuhara et al. ........ 264/406 |

(Continued)

FOREIGN PATENT DOCUMENTS

EP  0 686 484  12/1995

(Continued)

OTHER PUBLICATIONS

U.S. Appl. No. 11/200,848, filed Aug. 9, 2005.

(Continued)

*Primary Examiner*—Philip C Tucker
*Assistant Examiner*—Dimple N Bodawala
(74) *Attorney, Agent, or Firm*—Stout, Uxa, Buyan & Mullins; Frank J. Uxa; Greg S. Hollrigel

(57) ABSTRACT

Systems and methods of manufacturing ophthalmic lenses, for example, soft, extended wear silicone hydrogel contact lenses, are provided. The systems generally include a housing having an illuminated chamber, a carrier, for example a tray, movable in the illuminated chamber from an inlet portion to an outlet portion of the housing, and the tray configured to carry a plurality of contact lens molds. Polymerizing light energy is provided, for example, by multiple fluorescent lamps, to the molds at an intensity effective to at least initiate polymerization of a monomer composition located in each of the molds. The light may be illuminated onto two opposing sides of each mold. In some cases, the intensity of the light provided to one side of the mold may be different to the light intensity provided to the opposing side of the mold. In addition, the system may include features that are effective to provide for an instantaneous start and an instantaneous end to the light induced cure of the monomer in the molds. The system may include DALI protocol based technology for controlling the fluorescent lamps.

21 Claims, 15 Drawing Sheets

U.S. PATENT DOCUMENTS

| | | | |
|---|---|---|---|
| 5,135,686 A * | 8/1992 | Masuhara et al. | 264/406 |
| 5,158,718 A | 10/1992 | Thakrar et al. | |
| 5,407,627 A | 4/1995 | Schiller et al. | |
| 5,597,519 A | 1/1997 | Martin et al. | |
| 5,759,318 A | 6/1998 | Galas | |
| 5,779,855 A * | 7/1998 | Amo et al. | 156/379.6 |
| 5,804,107 A | 9/1998 | Martin et al. | |
| 5,900,098 A * | 5/1999 | Mueller et al. | 156/275.7 |
| 5,972,249 A * | 10/1999 | Wrue et al. | 264/1.1 |
| 6,039,899 A | 3/2000 | Martin et al. | |
| 6,071,112 A * | 6/2000 | Calvin et al. | 425/445 |
| 6,200,124 B1 * | 3/2001 | Buazza et al. | 425/174.4 |
| 6,310,116 B1 | 10/2001 | Yasuda et al. | |
| 6,333,605 B1 | 12/2001 | Grouev et al. | |
| 6,359,024 B2 | 3/2002 | Lai | |
| 6,464,484 B1 | 10/2002 | Powers et al. | |
| 6,465,538 B2 | 10/2002 | Lai | |
| 6,494,702 B1 * | 12/2002 | Buazza et al. | 425/174.4 |
| 6,511,617 B1 | 1/2003 | Martin et al. | |
| 6,551,531 B1 | 4/2003 | Ford et al. | |
| 6,638,451 B1 | 10/2003 | Hagmann et al. | |
| 6,709,257 B2 * | 3/2004 | Foreman et al. | 425/145 |
| 6,790,873 B2 | 9/2004 | Tomono et al. | |
| 6,821,461 B1 * | 11/2004 | Bessiere et al. | 264/2.5 |
| 6,822,016 B2 | 11/2004 | McCabe et al. | |
| 7,139,636 B2 * | 11/2006 | Foreman et al. | 700/198 |
| 2002/0004574 A1 * | 1/2002 | Hung et al. | 526/321 |
| 2002/0016383 A1 | 2/2002 | Iwata et al. | |
| 2002/0137811 A1 | 9/2002 | Turek et al. | |
| 2002/0163619 A1 | 11/2002 | Matsuzawa et al. | |
| 2002/0168438 A1 * | 11/2002 | Foreman | 425/135 |
| 2003/0031746 A1 | 2/2003 | Calvin et al. | |
| 2003/0049346 A1 | 3/2003 | Calvin et al. | |
| 2003/0090014 A1 | 5/2003 | Heinrich et al. | |
| 2003/0125498 A1 * | 7/2003 | McCabe et al. | 528/25 |
| 2004/0000732 A1 | 1/2004 | Spaulding et al. | |
| 2004/0075182 A1 | 4/2004 | Gobron | |
| 2004/0104504 A1 * | 6/2004 | Bravinski | 264/154 |
| 2006/0043623 A1 * | 3/2006 | Powell et al. | 264/1.32 |
| 2007/0035052 A1 * | 2/2007 | Goodenough et al. | 264/1.32 |

FOREIGN PATENT DOCUMENTS

| | | |
|---|---|---|
| EP | 0 908 476 A2 | 4/1999 |
| EP | 1 314 527 | 5/2003 |
| JP | 57004736 A * | 1/1982 |
| WO | WO 01/15497 A1 | 3/2001 |

OTHER PUBLICATIONS

U.S. Appl. No. 11/200,648, filed Aug. 9, 2005.
U.S. Appl. No. 11/201,410, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.
U.S. Appl. No. 60/604,961, filed Aug. 27, 2004.
U.S. Appl. No. 60/621,525, filed Oct. 22, 2004.

* cited by examiner

SYSTEMS AND METHODS FOR PRODUCING CONTACT LENSES FROM A POLYMERIZABLE COMPOSITION

The present invention generally relates to systems and methods for producing contact lenses, such as silicone hydrogel contact lenses. More specifically, the present invention relates to systems and methods for curing or polymerizing lens precursor compositions to form contact lenses.

BACKGROUND

It is known that compositions comprising one or more olefinically unsaturated monomers together with a small but effective amount of a polymerization initiator which is responsive to ultraviolet radiation of a given intensity and/or wavelength can be initiated or polymerized by exposure of the composition to the indicated intensity and/or wavelength of ultraviolet radiation. It is also generally recognized that control of the initiation and propagation of polymerization is difficult. Accordingly, in many conventional applications of ultraviolet-initiated polymerization, the polymerization has been sought to be controlled by variations of the identity and/or amount of ultraviolet initiator, the presence and/or amount of a polymerization inhibitor, and the characteristics of the ultraviolet radiation used to initiate the polymerization itself.

Because of the relative difficulty of controlling the polymerization characteristics and the properties of the resultant polymerized article, it has generally been considered that ultraviolet-induced polymerization is not completely satisfactory as a means for producing polymerized articles which must pass exacting requirements as to the dimensions and the physical properties such as structural integrity, surface smoothness, freedom from discernable irregularities in the internal structure and surface finish, clarity, transparency, and the like. Contact lenses are noteworthy examples of such articles which are subject indeed to numerous exacting criteria, by virtue of both the physical reality that contact lenses with even minor defects are considered unwearable, and of the regulations governing such articles prescribed by the U.S. Food and Drug Administration, among other national and international authorities.

There is therefore a need for effective methods and systems for producing articles such as contact lenses by means of ultraviolet-induced polymerization.

SUMMARY OF THE INVENTION

Accordingly, new systems and methods for manufacturing contact lenses, for example, silicone hydrogel contact lenses, are provided. The systems and methods are especially useful for the manufacture of lenses that are molded in contact lens molds containing polymerizable lens precursor compositions, for example, monomeric compositions comprising light-sensitive initiators.

The present invention is also particularly useful for the manufacture of contact lenses formed from materials requiring precise or even exacting control over polymerizing conditions, for example, manufacture of lenses formed from materials requiring very low intensities of light, for example ultraviolet light, to cause or initiate polymerization of lens precursor compositions.

The present systems provide substantially constant and consistent illumination of filled contact lens molds during a polymerization process. The present systems include one or more features or elements to provide rapid exposure of contact lens molds containing a lens precursor composition to a uniform intensity of ultraviolet light and for a time effective in polymerizing the lens precursor composition in the lens molds. The present systems can be automated and are configured to process large quantities of contact lenses, such as silicone hydrogel contact lenses.

In one embodiment, a system for producing a contact lens, such as a silicone hydrogel contact lens, can be understood to comprise a housing, a first set of ultraviolet lamps located at a first region within the housing, a second set of ultraviolet lamps located at a second region within the housing, the second set of lamps being spaced apart from the first set of lamps to define a space to accommodate a plurality of contact lens mold assemblies, which comprise a lens precursor composition, to provide a substantially uniform exposure of the lens precursor composition to ultraviolet light emitted from the first and second set of lamps.

In one embodiment, the contact lens mold assemblies are located on a tray or carrier structured to hold the assemblies and simultaneously expose two substantially opposing surfaces of the assemblies to the ultraviolet light emitted from the lamps. In certain embodiments, the housing comprises a conveyor system for directing the contact lens mold assemblies, or a tray of contact lens mold assemblies, from an input end toward an output end of the housing. In other embodiments, the housing may be devoid of a conveyor system, and the mold assemblies can remain in a substantially fixed position relative to the housing during exposure to the ultraviolet light.

The present systems are structured to substantially simultaneously expose all of the contact lens mold assemblies to a uniform amount of ultraviolet light throughout the curing process, including during the insertion and removal stages of the curing process. For example, the lens precursor composition contained in the mold assemblies is not exposed to amounts of ultraviolet light that would be sufficient to cause premature polymerization of the lens precursor composition. Any exposure of the lens precursor composition in the mold assemblies prior to the curing process would be insufficient to cause polymerization or curing of the lens precursor composition that would adversely affect the final polymerized product. In certain embodiments, the housing comprises one or more light shields effective in reducing or preventing premature exposure of the lens precursor composition to the ultraviolet light. The light shields can be plates or other substantially flat surfaces defining a path into the housing where the lens precursor composition can be polymerized. Or, light shields can be gates that interfere with movement of the mold assemblies and/or interfere with the passage of light from the housing which could cause premature exposure of the lens precursor composition to the light. In addition, or alternatively, the present systems can include one or more guiding devices effective in moving the lens mold assemblies into the housing at a relatively rapid rate compared to the entire curing process.

In a broad aspect of the invention, methods of manufacturing ophthalmic lenses, for example silicone hydrogel contact lenses, including extended wear and daily wear silicone hydrogel contact lenses, are provided. The methods generally comprise providing a mold defining a lens shaped cavity, providing a polymerizable composition in the lens shaped cavity, and exposing the mold and polymerizable composition therein to polymerizing radiation, for example, ultraviolet light, in order to facilitate or at least assist in causing or to cause polymerization of the polymerizable composition in the mold.

Preferably, the polymerizable composition comprises a formulation comprising one or more silicon-containing monomers and/or silicone-containing macromers. Thus, it may be understood that the present systems and methods are effective in forming silicone hydrogel contact lenses from silicon-containing monomeric compositions. In one embodiment, the polymerizable composition is effectively polymerized by a method including a step of exposing the composition, for example, exposing a mold and the polymerizable composition therein to light in the ultraviolet spectrum having an illumination intensity of between about 100 $\mu W/cm^2$ or about 200 $\mu W/cm^2$ or about 300 $\mu W/cm^2$ and about 900 $\mu W/cm^2$ or about 1000 $\mu W/cm^2$ or about 2000 $\mu W/cm^2$. In a preferred embodiment, the polymerizable composition is effectively polymerized by exposing the mold and the polymerizable composition to light in the ultraviolet spectrum having an illumination intensity of between about 300 $\mu W/cm^2$ and about 1000 $\mu W/cm^2$. In certain embodiments, the illumination intensity provided by the light emitting devices can be greater than 3000 $\mu W/cm^2$. For example, the illumination intensity can be from about 3000 $\mu W/cm^2$ to about 8000 $\mu W/cm^2$.

Unless indicated otherwise herein, illumination intensity values are based on measurements at the outer surface of molds, and measured using a Spectronics Corporation digital radiometer DRC-100X with DIX 365A sensor. This is calibrated by Spectronics Corporation in New York, U.S.A., to NIST standards. The radiometer records integrated intensity between the wavelengths of about 320 nm and about 400 nm.

In one embodiment of the invention, the polymerizable composition filled mold is exposed to ultraviolet light, such as substantially consistent ultraviolet light, for a period of time sufficient to provide effective polymerization of the polymerizable composition, for example, in a range of about 5 minutes, or about 15 minutes, or about 30 minutes, to about 45 minutes, or about 60 minutes, or about 120 minutes, or longer. Preferably, both the initiation and the termination of the ultraviolet light exposure are rapid or substantially instantaneous, or as close to instantaneous as possible. The polymerizing light facilitates, or at least assists in causing, or causes the polymerization of the polymerizable composition within the mold cavity and the formation of a polymerized article. The present systems and methods attempt to reduce the amount of unpolymerized monomeric components or other unpolymerized components within the final polymerized article.

In some embodiments, the method may further comprise exposing the mold or plurality of molds to ultraviolet light having an intensity at the surface of the mold or plurality of molds in a range of about 100 $\mu W/cm^2$, or about 300 $\mu W/cm^2$, or about 500 $\mu W/cm^2$ to about 700 $\mu W/cm^2$, or about 900 $\mu W/cm^2$, or about 1100 $\mu W/cm^2$ or greater. In other embodiments, the mold or plurality of molds are exposed to an ultraviolet intensity of about 1300 $\mu W/cm^2$, or about 1500 $\mu W/cm^2$, or about 2000 $\mu W/cm^2$, or about 3000 $\mu W/cm^2$, or about 4000 $\mu W/cm^2$, or about 6000 $\mu W/cm^2$ or about and 8000 $\mu W/cm^2$. In a preferred embodiment of the invention, the mold or plurality of molds, are exposed to ultraviolet light having an intensity of no greater than about 400 $\mu W/cm^2$ for example, an intensity of about 340 $\mu W/cm^2$. In certain embodiments, the intensity of the light can vary relative to an average or mean value. For example, the intensity of light can vary by about 50 $\mu W/cm^2$. In embodiments where the average UV light intensity is about 340 $\mu W/cm^2$, the light intensity can vary by about 15% (e.g., 340±50 $\mu W/cm^2$). In other embodiments where the average light intensity is about 900 $\mu W/cm^2$, the light intensity can vary by about 5% (e.g., 900±50 $\mu W/cm^2$). The intensity of light emitted by the present systems can vary depending on the lens precursor composition present in the molds. For example, one silicon-containing lens precursor composition may require an intensity of about 900 $\mu W/cm^2$ whereas another different silicon-containing composition may only require an intensity of about 340 $\mu W/cm^2$. The intensities can be chosen empirically taking into consideration factors such as properties of the initiator, if any, and the monomeric components of the lens precursor composition.

In another broad aspect of the invention, systems are provided for polymerizing or curing a polymerizable composition by applying light energy to a plurality of molds containing the polymerizable composition. For example, systems are provided for polymerizing a polymerizable composition, held in a plurality of molds, to form a plurality of ophthalmic lenses therefrom. Each of the molds is preferably configured to impart a desired shape of an ophthalmic lens for example, a contact lens, to the composition, upon polymerization of the polymerizable composition.

In one aspect of the invention, the systems are structured and designed to provide a substantially consistent, more preferably a substantially uniform, dose or amount or intensity of light, preferably ultraviolet light, to a plurality of filled molds in a manner such that each one of the filled molds is exposed to substantially the same polymerizing radiation as each of the other molds. The systems are designed to enable large scale production of lenses, for example, contact lenses. The present systems can be used in the manufacture of a relatively large number of contact lenses having uniform, consistent, and/or reproducible quality.

In one embodiment of the invention, systems are provided which generally comprise a housing having a chamber, an inlet, and an outlet; and a tray configured to hold a plurality of molds, wherein each mold includes a lens shaped cavity that contains a polymerizable composition. The tray is movable through the chamber in the housing from the inlet to the outlet.

The systems further comprise a source of light, for example, a source of ultraviolet light, for illuminating the chamber in order to provide polymerizing radiation to the molds therein and the polymerizable composition contained in the molds. For example, the source of light may comprise a plurality of light emitting elements or lamps structured and/or positioned to illuminate the housing chamber.

The present systems are particularly useful for the manufacture of contact lenses, for example, silicone hydrogel contact lenses or contact lenses that comprise a silicone hydrogel material, including extended wear and daily wear contact lenses. Each mold may comprise a first mold section and a second mold section which, when assembled together, form a contact lens shaped cavity therebetween. A polymerizable composition is located within and can fill the cavity. The polymerizable composition may be understood to be a contact lens precursor material, for example, a silicon-containing monomer composition that polymerizes upon exposure to ultraviolet light to form a silicon hydrogel polymeric composition.

In another aspect of the invention, systems are provided which comprise a light assembly, for example, a light assembly comprising a first light source for radiating light toward or onto a first surface of a tray, the first surface of the tray supporting a plurality of mold assemblies, and a second light source, for radiating light toward or onto a substantially opposing second surface of the tray from which the mold assemblies extend beyond. Advantageously, the system is preferably structured such that each of the molds carried by the tray is exposed to light, for example, ultraviolet light, radiated from both the first light source and the second light source.

Each of the first light source and the second light source may comprise a plurality of light sources, for example, a plurality of light emitting elements, for example, a plurality of ultraviolet light emitting elements, such as lamps, tubes and the like, mounted within the housing. For example, the first light source may comprise a plurality of ultraviolet lamps spaced apart from an upper surface of the tray and positioned to provide light to the upper surface of the tray. Similarly the second light source may comprise a plurality of ultraviolet lamps spaced apart from a lower surface of the tray and positioned to provide light to the lower surface of the tray. Advantageously, the molds held in the tray are exposed to ultraviolet radiation from both above and below the molds.

In order to provide maximum exposure to both top and bottom major surfaces of each of the molds, the tray may include a plurality of apertures or through holes, each of the apertures being sized and configured to allow a single mold, or portion thereof, to be seated within the aperture, with top and bottom major surfaces of each of the molds being not substantially covered or concealed by the tray.

The system may further comprise a transport means or assembly, for example, a conveyor assembly, for moving or transporting the tray and molds carried thereby through the housing chamber, for example, during the polymerization process. It is desirable that during the polymerization process, the molds are substantially consistently illuminated with substantially consistent, or even substantially uniform, intensity, and advantageously are not substantially shadowed or shielded by any components of the conveyor assembly. For example, the conveyor assembly may comprise a moving edge conveyor, for example, including a pair of opposing tracks or belts for accommodating opposing peripheral edge portions of the tray, for example, the mold-filled tray.

In one aspect of the invention, the conveyor assembly is positioned and structured so as to provide substantially consistent, substantially uniform illumination intensity to each of the molds being transported thereby. For example, the system is structured to minimize or reduce the effects of shielding the molds from ultraviolet light when the molding assemblies pass through the illuminated chamber.

In accordance with one aspect of the invention, the conveyor assembly may be mounted in or to the housing by means of a support structure or support structures in such a manner so as to provide substantial consistency and substantial uniformity of exposure of the molds to effective amounts of light or polymerizing radiation. For example, in some embodiments of the invention, the support structure includes structure which holds the conveyor belt or belts away from any of the main support structures of the conveyor assembly so as to position the molds on the tray away from any shadowing by the main support structures.

In some embodiments of the invention, there are four support elements which together hold the conveyor belt or belts away from any shadowing effects caused by the conveyor support. For example, in one configuration, the support structure comprises a first structural element secured to the housing, and a first outrigger element secured to the first structural element and extending away from and substantially perpendicular to the first structural element. In addition, there is included a second support element secured to the first outrigger element and substantially parallel with the first structural element, and a second outrigger element secured to the second structural element and extending away from the second structural element and substantially perpendicular thereto.

The first and second outrigger elements are substantially parallel to each other and provide a structure for supporting the conveyor in a position somewhat away from the edges of the system where there is an increased risk of shadowing occurring.

In another aspect of the invention, the present systems include assemblies for providing a substantially instantaneous start and/or a substantially instantaneous end or finish to exposing the molds and polymerizable compositions contained therein to effective amounts of light. Various structures may be employed to achieve such starts and/or ends or finishes.

The system may include structure effective to shield or block the mold-filled tray from being prematurely exposed to effective light, meaning, light having an intensity effective to initiate or cause polymerization of the polymerizable composition in the molds.

For example, in some embodiments of the present invention, a UV-light guarded inlet vestibule is provided for containing or holding newly filled molds in a tray prior to the tray being placed in the illuminated chamber. The inlet vestibule may be located directly adjacent the entrance of the chamber. In addition, a UV light shield may be provided for substantially preventing UV light from entering the inlet vestibule from the illuminated chamber. The light shield may be in the form of a gate, for example, a movable, pneumatic gate that is normally closed and is opened, for example, automatically opened, when the mold filled tray is moved from the inlet vestibule into the light chamber.

An outlet vestibule, similar to or identical to the inlet vestibule, can be provided adjacent the exit of the illuminated chamber for holding a mold filled tray immediately after the polymerization process. Like the inlet vestibule, the outlet vestibule may include a pneumatic gate that is normally closed and can be automatically opened when the tray is moved from the light tunnel into the outlet vestibule.

Additional or alternative elements, structures and/or mechanisms may be provided for substantially eliminating or at least reducing occurrence of UV exposure of the filled molds before the molds are placed on the light tunnel and after the molds have been cured in the light tunnel. For example, rather than the vestibules described hereinabove, the illuminated chamber inlet may be structured in the form of an inwardly extending slot, hereinafter sometimes referred to as a "letter-box" inlet or opening. For example, the inlet to the light tunnel may be defined by a slot having inwardly extending upper and lower panels, shields or other structures, the slot being sized to hold at least one mold-filled tray therebetween.

In embodiments of the invention employing the letter box inlet, one or more, preferably at least two light emitting elements are disposed immediately above and below the inwardly extending structure in order to enhance consistency of illumination intensity within the light tunnel during the entrance and exit of the mold assemblies.

A substantially identical outlet portion having a letter-box type structure may be provided within the housing. In order to further maintain substantially consistent, advantageously substantially uniform, illumination intensity within the housing chamber, at least one optical surface may be provided for reflecting and/or diffusing light in the chamber.

In some embodiments of the invention, the optical surface may comprise a reflective material and/or a substantially non-reflective material disposed on, for example painted on, one or more interior walls of the chamber housing. The optical surface preferably is structured and/or positioned with respect to the light source so as to reflect light, for example, ultraviolet light, in a manner that will enhance the polymerization process for example, by providing an enhanced degree of consistent illumination to the molds.

Advantageously, in some embodiments of the invention, optical surfaces are provided having a plurality of different reflectivities. By appropriate selection of high reflectivity surfaces and/or low reflectivity surfaces, or a combination thereof, substantially optimum cure conditions in the housing can be achieved. In other words, the optical surfaces, in conjunction with the light emitting element(s) can be used as a means of causing light provided to the molds to be substantially uniform across all of the molds.

In some embodiments of the invention, the system comprises a plurality of different optical surfaces providing different degrees of reflectivity, the optical surfaces being effectively positioned in the housing to cause substantially uniform distribution of light over surfaces of the tray and molds carried thereby. The plurality of optical surfaces are preferably effective to increase uniformity of light provided to the tray or trays and molds carried thereby, relative to an identical system having less than a plurality of optical surfaces for example a system having an optical surface having only a single reflectivity.

For example, the plurality of optical surfaces may include a first optical surface having a first reflectivity, a second optical surface having a second reflectivity that is greater than the first reflectivity. In some embodiments, a third optical surface having a third reflectivity greater than the second reflectivity may be provided.

More specifically, the first optical surface may be about 0% and about 30% reflective and the second optical surface may be between about 10% reflective and about 50% reflective, of the light emitted from the light source.

In a particular embodiment of the invention, the first optical surface is about 0% reflective and the second optical surface is about 30% reflective. For example, the first optical surface may be a Matte Black surface and the second optical surface may be a Matte Gray surface.

If desirable for enhancing uniform distribution of light, a third optical surface comprising a reflective aluminum or the like may be provided.

In another aspect of the invention, the optical surface or optical surfaces are effective to provide enhanced control over the distribution of light within the chamber, relative to a chamber not including optical surfaces. The optical surfaces are used to provide optimum cure conditions by causing each and every one of the molds and the polymerizable compositions contained therein to be exposed to a substantially consistent, preferably substantially uniform distribution of light preferably having a substantially optimal cure intensity, during the cure period.

Various structures may be employed to provide the optical surfaces. For example, reflective elements may be provided at locations within the housing that are effective to achieve substantially uniform distribution of light. The optical surfaces having the desired reflectivity may comprise one or more materials selected from metallic materials, for example, aluminum or aluminum-containing materials, paints, for example, Matte Black, Matte Gray, opaque, translucent or the like, polishes, and/or any other suitable material that can provide a desired degree of reflectivity when placed in the chamber.

In a more specific aspect of the invention, the optical surfaces are utilized to compensate for non-uniform light emitted from a light source, for example a light source comprising an assembly of ultraviolet lamps, for example, ultraviolet fluorescent tubes. As mentioned elsewhere herein, fluorescent tubes are useful in the present invention for supplying effective light for polymerizing or initiating polymerization of compositions in the mold assemblies. Fluorescent tubes typically tend to have regions of high intensity and regions of low intensity light. Typically, fluorescent tubes produce lower intensity light at the end portions of the tubes, and relatively higher intensity of light at the central portions of the tubes. For this reason, when the light source of the system of the invention is an assembly of ultraviolet lamps, it is desirable to position one or more optical surfaces having relatively high reflectivity adjacent end portions of the lamps in order to increase illumination intensity to molds located or passing adjacent the tube end portions.

In another aspect of the invention, a plurality of optical surfaces are provided wherein one or more of the optical surfaces are spaced apart from the ultraviolet light source at different distances relative to one or more other of the reflecting elements. For example, in order to increase illumination intensity at or near end portions of the fluorescent tube, optical surfaces may be placed closer to the end portions relative to the optical surface or surfaces which are placed to reflect light from the central portion of the fluorescent tubes.

In yet another aspect of the present invention, the present systems preferably include features which are directed at minimizing lens distortion and/or improving edge shape of the finished lens. For example, the systems may be structured such that the first light source illuminates one surface of the tray, and filled molds, with light having a first intensity, and the second light source illuminates the opposing surface of the tray, and filled molds, with light having a second intensity that is different from the first intensity.

Advantageously, the first and second intensities of the first and second light sources respectively, are selected to achieve a reduced distortion and/or an improved edge shape of the lenses formed from the polymerizable composition contained in the plurality of molds after polymerization of the composition. For example, in one embodiment of the invention, the top surfaces of the tray, and filled molds, are exposed to ultraviolet light at a first intensity and the bottom surfaces of the tray and filled molds are exposed to ultraviolet light at a second intensity, wherein the second illumination intensity is less than, or reduced relative to, the first illumination intensity.

In another aspect of the present invention, the system is structured so as to maintain a desired temperature within the housing. In a preferred embodiment of the present invention, the desired temperature maintained within the housing, for example, within the chamber of the housing, is between about 15 degrees C. or about 20 degrees C. to about 30 degrees C. or about 35 degrees C. In one embodiment, the desired temperature within the housing is substantially maintained at about 25 degrees C. Effective maintenance of temperature may be accomplished by utilization of temperature sensors and/or cooling devices implemented into the system. Preferably, the system is designed to effect polymerization or curing of the polymerizable composition by light energy, for example, ultraviolet light energy, without any substantial heat-induced polymerization of the composition.

In one aspect of the invention, devices for monitoring light intensity within the chamber are provided. For example, remote data loggers, capable of sensing and recording light intensity, may be placed at various positions on one or more of the trays while the trays are being conveyed through the chamber.

In yet another aspect of the invention, the present systems include detection means or assemblies for detecting failure of individual light sources. Preferably, such assemblies include an electronic ballast connected to a pair of light emitting elements and a control assembly that utilizes DALI protocol-based technology to identify and alert an operator to lamp failure.

Each and every feature described herein, and each and every combination of two or more of such features, is included within the scope of the present invention provided such feature included in such combination are not mutually inconsistent. In addition, any feature or combination of features may be specifically excluded from any embodiment of the present invention.

These and other aspects of the present invention are apparent in the following detailed description and claims, particularly when considered in conjunction with the accompanying drawings in which like parts bear like reference numerals.

BRIEF DESCRIPTION OF THE DRAWINGS

FIG. 4D' is a plan view of an optical surface taken along line 4D'-4D' in FIG. 4D.

DETAILED DESCRIPTION

The present invention will typically be described herein with respect to methods and systems useful for the manufacture of contact lenses, though it is to be appreciated that, with appropriate modification thereto, the present methods and systems may be useful for the manufacture of other types of ophthalmic lenses and other light-polymerizable articles in general.

The following documents are incorporated by reference in their entireties: Martin et al., U.S. Pat. No. 5,597,519; Galas, U.S. Pat. No. 5,759,318; Grouev et al, U.S. Pat. No. 6,333, 605; Lai, U.S. Pat. No. 6,359,024; Lai, U.S. Pat. No. 6,465, 538; Iwata et al., U.S. Patent Publication No. 2002/0016383; Heinrich et al., U.S. Patent Publication No. 2003/0090014; European Patent Application No. EP 1 314 527; and European Patent Application Publication No. 0 686 484.

The term "contact lens" as used herein refers to an ophthalmic lens which, after its removal from a mold in which it is made, is of a structure, size, shape and power that it can be worn on the cornea of an eye. The term "contact lens" can also be understood to refer to an article which upon removal from a mold needs to be treated, for example, hydrated and swelled into a lens of size, shape and power as to be wearable on an eye.

Preferably, the contact lens is a hydrogel-containing lens, more preferably a silicon hydrogel-containing lens.

Figure 1:
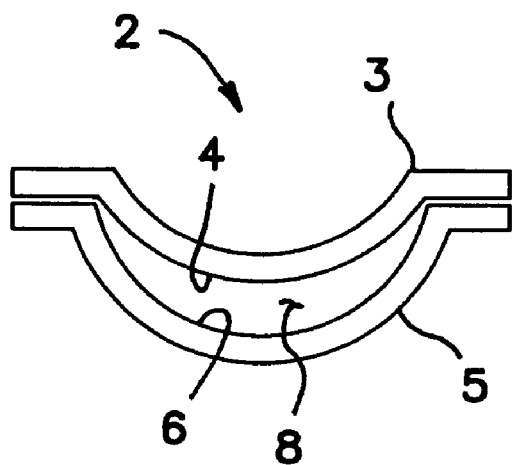
FIG. 1 is a simplified cross-sectional view of a mold useful for forming a contact lens.

In a broad aspect of the invention, methods of manufacturing ophthalmic lenses, for example but not limited to soft silicone hydrogel lenses, are provided. The methods generally comprise providing a mold assembly 2, such as the mold assembly 2 shown in cross sectional view in FIG. 1. The mold assembly 2 may comprise a lens mold, including a first mold section 3 having a first lens defining surface 4 and a second mold section 5 having a second lens defining surface 6. As shown in FIG. 1, the first and second mold sections 3 and 5 define a lens shaped cavity 8 between the first convex lens defining surface 4 and the second concave lens defining surface 6 when the first mold section 3 and the second mold section 5 are assembled together.

Figure 1A:
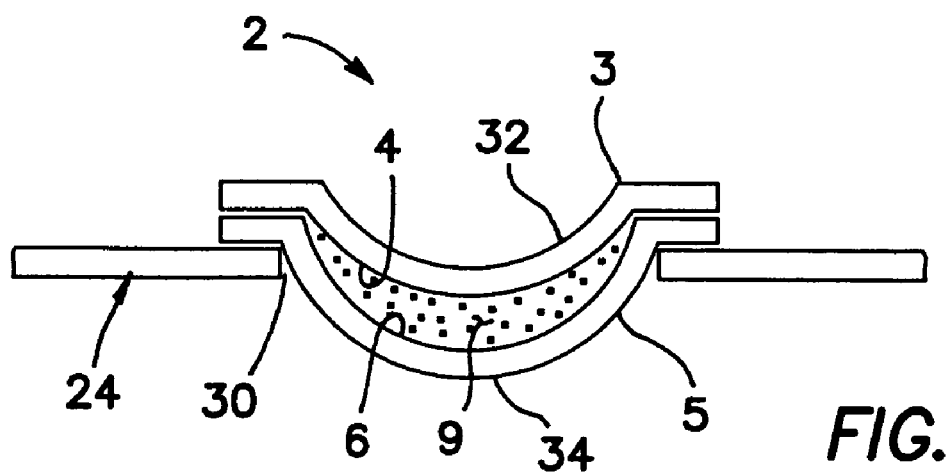
FIG. 1A is a cross-sectional view of the mold of FIG. 1 having a polymerizable composition disposed therein and being located in a tray useful in a system of the invention.

Turning now to FIG. 1A, a polymerizable composition 9 is provided in the lens shaped cavity 8. The polymerizable composition 9 can be understood to be a lens precursor composition. The polymerizable composition 9 can be a composition comprising one or more monomeric components suitable for producing contact lenses. The polymerizable composition 9 can be provided in the lens shaped cavity 8 by a number of different methods, for example, by injecting, dispensing, or otherwise introducing a polymerizable composition 9 into the lens shaped cavity.

Ophthalmic lenses manufactured using the present systems and methods may include ophthalmic lenses made from biocompatible, non-hydrogel materials or components. Examples of non-hydrogel materials include, and are not limited to, acrylic polymers, polyolefins, fluoropolymers, silicones, styrenic polymers, vinyl polymers, polyesters, polyurethanes, polycarbonates, cellulosics, proteins including collagen-based materials and the like and mixtures thereof.

Preferably, for the manufacture of contact lenses in accordance with the present invention, the polymerizable composition comprises a formulation comprising one or more silicon-containing monomers and/or silicone-containing macromers.

A preferred polymerizable composition for the manufacture of silicone hydrogel lenses that is suitable for use in the systems and methods of the present invention is described in U.S. Application No. 60/604,961, filed Aug. 27, 2004 and U.S. Application No. 60/621,525, filed Oct. 22, 2004, which are hereby incorporated by reference in their entireties. The polymerizable composition may include components such as a tint component, a UV blocker component, and/or the like.

A method of the present invention may comprise a step of exposing the closed mold assembly 2 to polymerizing initiating radiation, preferably, in the form of ultraviolet light, in order to initiate and cause polymerization of the polymerizable composition 9 in the mold assembly 2. The step of exposing includes providing an effective amount of light to the mold assembly 2 that will cause complete polymerization of the polymerizable composition within the mold.

In one embodiment, the polymerizable composition 9 is effectively polymerized by a method including a step of exposing the composition, for example, exposing the mold assembly 2 and the polymerizable composition 9 therein, to light in the ultraviolet spectrum having an illumination intensity of between about 100 $\mu W/cm^2$ or about 200 $\mu W/cm^2$ or about 300 $\mu W/cm^2$ and about 900 $\mu W/cm^2$ or about 1000 $\mu W/cm^2$ or about 2000 $\mu W/cm^2$. More preferably, the polymerizable composition 9 is effectively polymerized, for example, substantially completely polymerized, by exposing the mold assembly 2 and the polymerizable composition 9 therein, to light, for example, light in the ultraviolet spectrum having an illumination intensity of between about 200 $\mu W/cm^2$ and about 1000 $\mu W/cm^2$, and more preferably, no greater than about 400 $\mu W/cm^2$.

It is to be appreciated that visible light initiators and/or other forms of light energy may additionally or alternately be employed within the scope of the present invention. Such initiators and/or other forms of light energy and corresponding appropriate modifications to the methods and systems described herein will be known to those of skill in the art and are considered to be within the scope of the present invention.

Unless expressly indicated otherwise herein, the illumination intensity values provided in the present detailed description refer to the illumination intensity occurring at an outer surface of the mold, as distinguished from the intensity of the light occurring within the polymerizable composition within the mold. In addition, unless expressly indicated otherwise herein, the values of illumination intensity provided in the present description are values obtained or obtainable when the intensity is measured using light sensors, such as a Spectronics Corporation digital radiometer DRC 100X with a DIX 365A sensor. This is calibrated by Spectronics Corporation located in New York, U.S.A., to NIST standards, or equivalent equipment calibration. The radiometer records integrated intensity between the wavelengths of 320 nm and 400 nm. For example, digital radiometers from different suppliers, and/or radiometers that are calibrated differently or to different standards may provide different intensity values.

The mold sections 3 and 5 can be made by any suitable molding technique known in the art.

The mold assembly 2, and preferably, each of the individual mold sections 3 and 5, comprises a suitable material that is at least partially transparent to the polymerizable radiation, for example, light, for example, ultraviolet light. By "at least partially transparent" is meant herein that some and preferably substantially all radiation having an intensity and/or wavelength effective to initiate polymerization of the polymerizable composition 9 or to polymerize the polymerizable composition 9, can pass through the mold portions 3 and 5 to polymerize or cure the polymerizable composition 9.

In a preferred embodiment, mold sections 3 and 5 that include, or are made of, an ethylene vinyl alcohol resin (hereinafter, usually, EVOH) are processed by the present systems and methods. One example of a suitable EVOH polymer or copolymer useful in the present molds is available under the trade name, SOARLITE. SOARLITE is associated with high mechanical strength, antistatic properties, low contractility during molding, oil and solvent resistance, small coefficient of thermal expansion, good abrasion resistance, and excellent molding processability. Thus, other polymeric materials with one or more similar properties may be useful in the producing molds useful in the present systems.

The mold portions 3 and 5 alternatively may be made of polystyrene or other suitable polymer material so long as the mold portions are at least partially transparent to the polymerization initiating wavelengths of light, and so long as the material permits removal of the molded article, for example, the lens, after the polymerization process. Other examples of suitable materials for the mold portions 3 and 5 include, but are not limited to, polyvinylchloride, polyethylene, polypropylene, copolymers or mixtures of styrene with acrylonitrile or butadiene, polyacrylonitrile, polyamides, polyesters and the like.

Preferably, the step of exposing comprises exposing the mold and polymerizable composition therein to a substantially consistent, preferably substantially uniform intensity of light. For example, such substantially consistent exposure is preferable over exposure to light having an intensity that varies during the polymerization period. In addition, it has been discovered that substantially optimal cure conditions for example, polymerization, can be achieved when the period of exposure to the ultraviolet light is substantially instantaneous.

The duration of exposure of the mold assembly to the polymerizing ultraviolet light is preferably a continuous period of exposure. The period of exposure, or cure period, is at least sufficiently long to cause substantially complete polymerization of the polymerizable material within the cavity, preferably with little or substantially no residue of unpolymerized material remaining within or on the mold. The duration of exposure may vary to some degree depending upon factors such as the specific formulation of the polymerizable composition.

In one embodiment of the invention, the duration of exposure, or period of exposure, is at least about 5 minutes, or about 10 minutes, or about 30 minutes to about 45 minutes, or about 60 minutes, or about 90 minutes, or more in length. In some embodiments of the invention, the period of exposure is at least about 20 minutes, for example at least about 30 minutes, to about one hour with the illumination intensity being less than 2000 $\mu W/cm^2$, for example, less than about 900 $\mu W/cm^2$, for example, less than 400 $\mu W/cm^2$. In a more specific embodiment of the invention, the cure period is between about 10 minutes and about one hour in length, during which time the mold is exposed to substantially consistent light having an illumination intensity of about 340 $\mu W/cm^2$.

In another aspect of the invention, methods are provided for manufacturing contact lenses by providing a mold assembly having a lens shaped monomer filled cavity therein, and exposing the mold to ultraviolet light having an illumination intensity of between about 8 $\mu W/cm^2$ to about 400 $\mu W/cm^2$, wherein, in this case, the intensity is the illumination intensity occurring within the monomer-filled lens shaped cavity.

In one embodiment of the present invention, mold assemblies 2 are provided that are made of EVOH based materials as described in greater detail elsewhere herein. The molds and the individual mold sections thereof have attenuation values of between about 80% to about 92% of incident light.

It will be appreciated by those of skill in the art that the intensity of light within the mold, for example the intensity of light at or within the polymerizable composition within the mold, depends on the properties of the mold through which the light must pass.

It has been discovered that when the intensity value at the mold surface is a value between about 100 $\mu W/cm^2$ and about 2000 $\mu W/cm^2$, the intensity range of the ultraviolet light at the interface of the mold and the polymerizable composition has a value between about 8 $\mu W/cm^2$ and about 400 $\mu W/cm^2$.

For example, if the attenuation of the mold is calculated to be between about 80% and about 92% of incident light, an intensity range of 300 $\mu W/cm^2$ to 1000 $\mu W/cm^2$ at the mold surface means the intensity value at the composition/mold section interface is a value within the range of between about 24 $\mu W/cm^2$ and about 200 $\mu W/cm^2$.

For reasons that will be appreciated by those of skill in the art, it is difficult to directly measure the intensity of the ultraviolet light occurring on the polymerizable material within the cavity of the mold. However, the intensity of the light within the cavity can be calculated if the attenuation of incident light by the mold is known. Generally, the intensity value within the mold cavity is calculatable by multiplying the intensity value of incident light at the mold surface (which is directly measurable using conventional equipment) by the mold attenuation value, which is provided as a percentage value.

Attenuation of light by the mold depends on many factors such as the composition of the mold material, the thickness and shape of the mold pieces, the wavelength and angle of incident light, etc. Measurement of attenuation values can be accomplished using carefully placed optic fibers and utilizing conventional spectrometer equipment.

The light intensity, for example ultraviolet light intensity, at the surface of the mold may be measured using a Spectronics Corporation Spectroline integrating radiometer, as discussed herein.

The following description provides a technique for determining ultraviolet intensity within the mold cavity, as compared to the intensity values measured at an exterior surface of the contact lens mold.

As mentioned hereinabove, it should be appreciated that intensity of ultraviolet light inside the monomer filled mold cavity can be calculated based on attenuation of the mold material which is a measurable value provided in units of percentage. Attenuation of incident light by the mold can be deducted from known information such as the type of mold material, the mold thickness, the shape of the mold, the position of the mold beneath the ultraviolet light source, the angle of measurement, and the wavelength of incident light.

Using values for attenuation of ultraviolet light by the mold material, it is possible to estimate the ultraviolet intensity values inside the mold cavity. Although theoretically a somewhat simple calculation, in practice this can be quite a complicated procedure.

The attenuation of incident light having a wavelength of 370 nm through a mold can be calculated as follows. For purposes of illustration, the EVOH mold has the following known or directly measurable parameters. Each EVOH mold section has a substantially continuous mold section thickness of about 1.6 mm measured between an outer surface of a mold section and the lens defining surface thereof. The light source is a single ultraviolet lamp. Measurement of intensity values are taken through a center line of the mold using a measurement fiber, specifically a fiber optic, for example, a 50 $\mu m$ diameter fiber optic placed vertically through and into the mold cavity. Intensity measurement values are determined using a spectrometer, for example, a StellarNet, Inc. EPP2000 spectrometer. Software, for example, Spectrawiz software by StellarNet, Inc., is also used to facilitate the calculations.

Using these known or directly measurable parameters, the attenuation of incident light through the mold is calculated to be about 85%. In other words, the value of light intensity inside the mold cavity is determined to be about 15% of the value of the incident light intensity.

It is noted that the intensity of light inside the mold cavity may be different than that described hereinabove when other variables are taken into account. For example, it is hypothesized that if the light is indirect light rather than direct light, the fiber optic sensor is not "looking" directly at the ultraviolet lamp, and the attenuation may be calculated to be lower. For example, it is believed that if the fiber optic sensor is recording indirect and scattered light, which can be described as "diffuse" light, the intensity value at the mold cavity will be affected. For example, using the same parameters as described hereinabove with the exception being that the fiber optic is not pointed directly at the light source, the attenuation of incident light will have a value of about 20%, such that the light inside the cavity is about 80% of incident light intensity.

Quality lens shaped products having minimal or negligible distortion and good edge shape can be produced using a desired range of intensity values provided at an exterior surface of EVOH molds. Suitable ranges of values can be determined as follows.

A number of identical or substantially identical EVOH contact lens molds are provided having the parameters described above. Each mold is given a label to identify the illumination intensity to which the particular mold will be exposed. Each mold is labeled with a different, specific ultraviolet intensity value, such that there are separately identified molds each labeled with a specific intensity value ranging from 20 $\mu W/cm^2$ to 8000 $\mu W/cm^2$.

The lens shaped cavity of each mold is filled with an identical amount of a contact lens precursor material, specifically a silicone hydrogel lens precursor composition comprising a polysiloxanyl dimethacrylate silicone monomer and a polydimethylsiloxane methacrylate derivative.

Each filled mold is placed in an ultraviolet light chamber having a desired illumination intensity. The chamber is illuminated with a continuous light having a constant illumination intensity. This light is provided by one or more ultraviolet emitting elements arranged above and below the mold. The mold is located about 70 mm spaced apart from the ultraviolet emitting elements. In this example, intensities between 20 $\mu W/cm^2$ and 1500 $\mu W/cm^2$ were provided by a Philips 20 watt ultraviolet florescent tube. Intensities between 2000 $\mu W/cm^2$ and 8000 $\mu W/cm^2$ are provided by a 400 watt ultraviolet flood lamp. The lamps can be provided by UV Light Technology Limited, Birmingham, England, B68 OBS. The lamps are connected to control equipment for setting and maintaining the desired constant illumination intensity in the chamber. The ultraviolet intensities are values of integrated intensity between the wavelengths of about 320 nm to about 400 nm.

Control measurements are provided or can be obtained using a sensor mechanism having a sensor head located about 70 mm from the surface of the ultraviolet emitting elements for ensuring accuracy of the ultraviolet light value at the outer surface of the mold. The intensity values at the mold surfaces are measured using Spectroline Digital Radiometer DRC-100X, Spectroline UVA-Sensor Dix 365A, manufactured by Spectronics Corporation, 956 Brush Hollow Road, Westbury New York 11590.

Each filled mold is exposed to the appropriate intensity value labeled on the mold. More specifically, each mold is exposed to an ultraviolet intensity having a value selected from the group consisting of 20 $\mu W/cm^2$, 100 $\mu W/cm^2$, 180 $\mu W/cm^2$, 300 $\mu W/cm^2$, 530 $\mu W/cm^2$, 700 $\mu W/cm^2$, 900 $\mu W/cm^2$, 1100 $\mu W/cm^2$, 1300 $\mu W/cm^2$, 1500 $\mu W/cm^2$, 2000 $\mu W/cm^2$, 3000 $\mu W/cm^2$, 4000 $\mu W/cm^2$, 6000 $\mu W/cm^2$ and 8000 $\mu W/cm^2$. The duration of exposure of the molds to the ultraviolet radiation is for an identical period of approximately ten minutes, which causes the monomer in each of the cavities to polymerize.

A control mold is also provided. The control mold comprises a closed mold with no lens precursor material in its lens shaped cavity. The control mold is exposed to ultraviolet light having an intensity of 8000 $\mu W/cm^2$ for the same period of exposure as the filled molds, i.e., for a period of approximately ten minutes.

After the exposure step, each mold is subjected to a hydration/removal process that is typical in the art. A polymerized lens product is thereby obtained and observed.

It is discovered that each of the polymerized lens products formed from the materials described above that have been cured with ultraviolet light at intensities about 20 $\mu W/cm^2$ or less, and each of the polymerized lens products that have been cured with ultraviolet light at intensities of greater than about 4000 $\mu W/cm^2$ all exhibit an undesirable white deposit on the surface of the mold. The polymerized lens products that have been cured with ultraviolet light at intensities of greater than 20 $\mu W/cm^2$ but less than 4000 $\mu W/cm^2$ exhibited no observable white residue. It is noted that these results at least in part relate to specific formulations of monomeric composition and that the results may be slightly different for other formulations of monomeric composition. A person of ordinary skill in the art, without undue experimentation, could find the intensity effective to achieve the desired curing results, such as a lack of white residue or other visible residue, based on a specific formulation of monomeric composition.

It is also found that the control mold (intensity value 8000 $\mu W/cm^2$, no lens precursor material in cavity) has no detectable white deposit after the exposure to the ultraviolet light.

Although not intending to be bound by or limited to any particular theory of operation, it is believed that the white deposit on the molds has been created by a polymerization reaction between hot water in the hydration step and residual precursor material or unreacted monomeric components which was not polymerized during the ultraviolet light exposure period. This theory would explain the absence of the white residue on the control mold. Thus it is believed that the white deposit on those molds exposed to about 20 $\mu W/cm^2$ or less, and those molds exposed to more than 4000 $\mu W/cm^2$ is due to the lens precursor material composition in the lens shaped cavity, and not the mold material itself.

This "white residue" is generally undesirable as it tends to create a rough surface on the contact lens. It is also believed that the presence of the white residue indicates that the contact lens product did not effectively and/or thoroughly polymerize within the mold cavity during the exposure to the ultraviolet light. It can be hypothesized that the presence of the white residual material indicates that there is less polymerized material incorporated into these lens products relative to those lens products showing no white residue. The lens products that have not thoroughly, or otherwise not effectively, polymerized will likely have characteristics, for example, swelling, that are different than those desirable characteristics.

In another aspect of the invention, the methods are designed to provide polymerizing radiation to the lens precursor material in the molds, without any significant addition of heat thereto. More specifically, it is preferred that no significant heat is involved in causing the polymerization of the lens product, only light energy.

For example, in one embodiment of the invention, the method of manufacturing ophthalmic lenses further comprises maintaining a cure temperature at between about 20 degrees C. and about 30 degrees C., for example about 25 degrees C. For example, this aspect of the invention may comprise steps directed at curing the contact lens precursor material by exposing the filled mold to ultraviolet light provided by an ultraviolet box comprising a substantially enclosed housing having ultraviolet emitting elements therein. The step of exposing is performed while the housing is maintained within the desired temperature range, for example using temperature sensors, cooling mechanisms and/or other means for maintaining the desired temperature within the housing.

Alternatively, the present methods can be practiced at room temperature without any temperature controllers. For example, successful curing of the lens precursor composition can be obtained at temperatures between about 20° C. and about 25° C., for example about 22° C. However, successful curing of the lens precursor compositions can occur at temperatures less than 20° C., such as 14° C.

In yet another aspect of the invention, the step of exposing the mold to ultraviolet light may comprise exposing both a first surface and a substantially opposing second surface of the mold to ultraviolet light. More specifically, the method includes radiating polymerizing radiation onto both a top surface of the mold, and substantially simultaneously radiating polymerizable radiation onto a bottom surface of the mold. This may be accomplished, for example, by providing an upper ultraviolet light source spaced apart from the top surface of the mold, and a lower ultraviolet light source spaced apart from a bottom surface of the mold.

For example, in one embodiment of the present invention, an ultraviolet light box or housing having an illuminated chamber may be provided wherein the light box is structured to receive a plurality of such molds. Preferred embodiments of suitable ultraviolet light boxes, in accordance with the present invention, are described in greater detail elsewhere herein. Generally however, for purposes of performing the methods of the present invention, a light box is provided which is equipped with a first set of light emitting elements and a substantially opposing second set of light emitting elements. The molds may be positioned between the first and second sets of light emitting elements by means of a suitable tray, rack or carrier structured to be placed into the light box between the first and second set of light emitting elements.

In a more specific aspect of the invention, the method includes placing the molds in a tray having a plurality of through holes, or apertures, each aperture being sized and configured to allow a mold to be removably seated therein. This arrangement allows optimal exposure of the plurality of filled molding assemblies to the ultraviolet radiation from both an upper source of ultraviolet light and a lower source of ultraviolet light. Thus, the molds can be readily placed in the ultraviolet light box in a manner that exposes the top and bottom surfaces of the molding assemblies to light which provides effective curing of the monomer composition.

In a related aspect of the invention, the method of manufacturing ophthalmic lenses includes exposing a first surface of the mold or mold assembly to ultraviolet light having a first illumination intensity and exposing a second substantially opposing surface of the mold to ultraviolet light having a second, different intensity. The method may comprise exposing different surfaces of the mold to different illumination intensities of ultraviolet light, wherein the intensities are selected so as to achieve reduced distortion, for example, more desirable edge shape, of the polymerized lens shaped product, relative to a lens shaped product produced using a substantially identical method without utilizing different illumination intensities.

It is an object of the invention to achieve a lens product having a reduced distortion, for example, an ovality of no greater than about 0.04 mm.

For example, in one embodiment of the invention, the top surface of the mold is exposed to ultraviolet light having a first illumination intensity and the bottom surface of the mold is exposed to ultraviolet light having a second illumination intensity that is less than the first illumination intensity. In a more specific embodiment of the invention, the first illumination intensity is about 400 $\mu W/cm^2$ and the second illumination intensity is in a range from between about 100 $\mu W/cm^2$, or about 150 $\mu W/cm^2$ to less than about 300 $\mu W/cm^2$ or less than about 400 $\mu W/cm^2$. In another related embodiment of the invention, the polymerizable composition includes an ultraviolet blocker component and the second illumination intensity is less than the first illumination intensity.

Lens measurements from various trials during the development of the present systems and methods, are shown as the following Table 1 to Table 6. These Tables illustrate how the different settings of upper and lower lamp intensity influence lens distortion and edge shape. The data in Table 1 to Table 6 were obtained using a monomeric composition including an ultraviolet blocker component.

Lens distortion is measured as both ovality and distortion of a strip sample of monomer material. It has been discovered that there are intensity settings which minimize ovality e.g., ovality of no greater than about 0.04 mm and create good edge shape.

TABLE 1

Material A. Lens ovality versus upper and lower lamp settings.

| Upper lamp Intensity $\mu W/cm^2$ | Lower lamp intensity $\mu W/cm^2$ | Average lens ovality mm |
|---|---|---|
| 400 | 400 | 0.15 |
| 400 | 230 | 0.07 |
| 400 | 150 | 0.05 |

TABLE 2

Material B. Lens ovality versus upper and lower lamp settings.

| Upper lamp Intensity $\mu W/cm^2$ | Lower lamp intensity $\mu W/cm^2$ | Average lens ovality mm |
|---|---|---|
| 400 | 400 | 0.73 |
| 400 | 320 | 0.08 |
| 400 | 230 | 0.04 |
| 400 | 150 | 0.04 |

TABLE 3

Material A. Distortion of strip sample versus upper and lower lamp settings.

| Upper lamp Intensity $\mu W/cm^2$ | Lower lamp intensity $\mu W/cm^2$ | Lens Diameter mm | Width of unsupported lens cross section mm | Difference mm |
|---|---|---|---|---|
| 400 | 400 | 13.03 | 11.14 | −1.89 |
| 400 | 230 | 13.30 | 13.29 | −0.01 |
| 400 | 150 | 13.45 | 14.93 | 1.48 |

TABLE 4

Material B. Distortion of strip sample versus upper and lower lamp settings.

| Upper lamp Intensity $\mu W/cm^2$ | Lower lamp intensity $\mu W/cm^2$ | Lens Diameter mm | Width of unsupported lens cross section mm | Difference mm |
|---|---|---|---|---|
| 400 | 400 | 13.27 | 11.08 | −2.19 |
| 400 | 320 | 13.21 | 11.47 | −1.74 |
| 400 | 230 | 13.31 | 12.78 | −0.53 |
| 400 | 150 | 13.44 | 14.36 | 0.92 |

TABLE 5

Material A. Edge shape versus upper and lower lamp settings.

| Upper lamp Intensity $\mu W/cm^2$ | Lower lamp intensity $\mu W/cm^2$ | Edge Shape |
|---|---|---|
| 400 | 400 | good |
| 400 | 230 | slight flare |
| 400 | 150 | flare |

TABLE 6

Material B. Edge shape versus upper and lower lamp settings.

| Upper lamp Intensity $\mu W/cm^2$ | Lower lamp intensity $\mu W/cm^2$ | Edge Shape |
|---|---|---|
| 400 | 400 | good |
| 400 | 320 | good |
| 400 | 230 | slight flare |
| 400 | 150 | flare |

Thus, in some embodiments of the present invention, the step of exposing includes exposing a top surface of the mold to a first intensity of polymerizing light and simultaneous therewith, exposing a bottom surface of the mold to a second intensity of polymerizing light wherein the second intensity is different from the first intensity.

Figure 2:
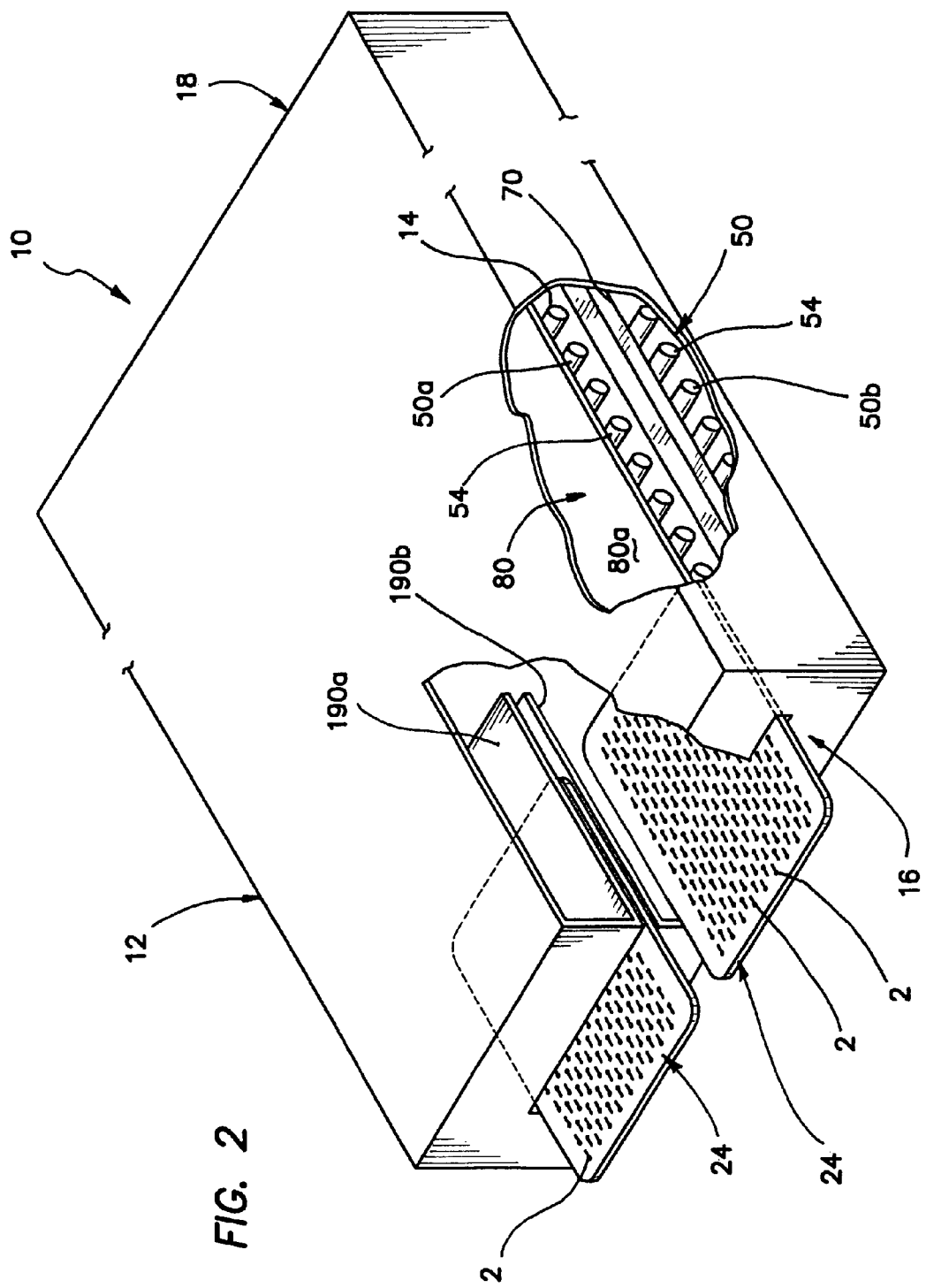
FIG. 2 is a perspective partially cut-away view of a system in accordance with the invention, the system being useful in practicing some of the methods of the present invention, and generally including a housing, a source of polymerizing radiation, and a conveyor assembly.

Turning now to FIG. 2, a system in accordance with the present invention for producing articles for example, ophthalmic lenses, for example, contact lenses, by means of light-induced polymerization of polymerizable compositions is generally shown at 10. The system 10 is especially useful in performing at least some of the methods of the present invention described elsewhere herein.

The system 10 may be structured to provide polymerizing radiation, in the form of light, for example ultraviolet light, to a mold assembly 2 such as shown in FIG. 1A, containing a polymerizable composition 9, for example, a lens precursor material.

The system 10 generally includes a housing 12 having a chamber 14, an inlet portion 16, an outlet portion 18, and a tray 24 (also shown in FIG. 1A) structured to be positioned within the housing chamber 14 and movable between the inlet portion 16 and the outlet portion 18. The tray 24 is configured to hold or carry a plurality of molds or mold assemblies 2, wherein each mold assembly 2 contains a polymerizable composition described elsewhere herein. In the embodiment shown in FIG. 2, system 10 is structured to accommodate two trays 24 in a side by side position, each tray 24 being structured to hold 256 molds. In other embodiments of the invention systems are provided that are structured to hold only one tray, or more than two trays, each of the trays being structured to hold any number of molds.

Turning back briefly to FIG. 1A, each mold assembly 2 is held within a suitably configured aperture or through hole 30 defined within the tray 24. For example, the tray 24 includes a plurality of through holes 30, each of the through holes 30 being sized and configured to allow a mold assembly 2 carried by the tray 24 to be seated therein. Each mold assembly 2 may be held with a concave exterior surface 32, or top surface, of the first mold portion 3 facing upward and a convex exterior surface 34, or bottom surface, of the second mold portion 5 facing downward.

In accordance with the present invention, the molds 2 further include a quantity of a polymerizable composition 9 located within the lens shaped cavity and preferably completely filling the lens shaped cavity.

The polymerizable composition preferably comprises a composition that polymerizes, for example substantially completely polymerizes, when exposed to light, for example ultraviolet light, for example, very low intensities of ultraviolet light, as described in greater detail elsewhere herein. The polymerizable composition may include components such as a tint component, a UV blocker component, and/or the like. In certain embodiments, the composition is free of a UV blocker component. Polymerizable compositions that are especially useful with the systems of the present invention include the compositions described in U.S. Application Nos. 60/604,961 and 60/621,525.

Figure 3:
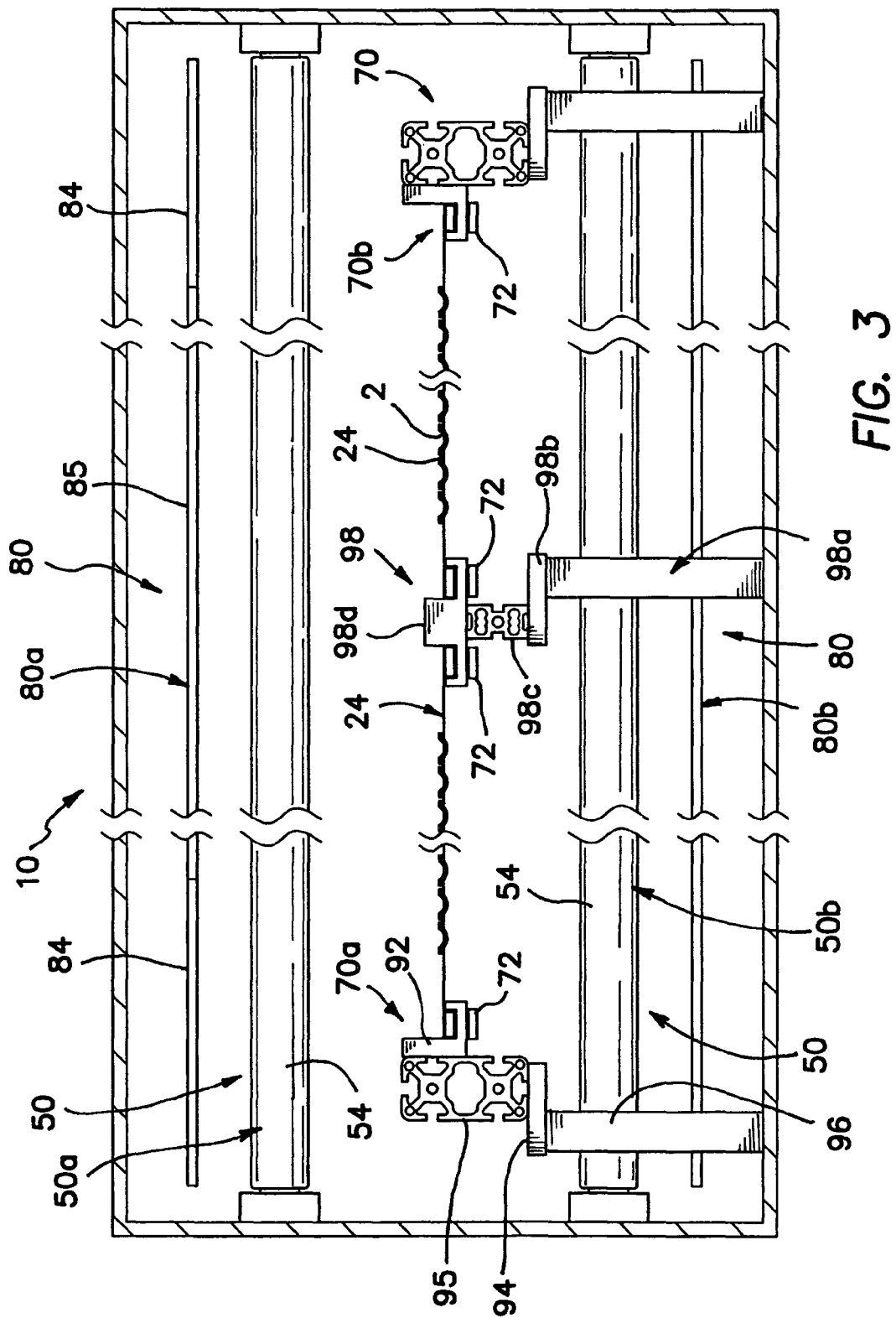
FIG. 3 is a cross-sectional view of the system shown in FIG. 2.

Turning now as well to FIG. 3, the system 10 further comprises a source of polymerizing radiation, preferably light, for example, ultraviolet light, effective to facilitate, for example initiate, polymerization of the polymerizable composition within the molds 2.

In the system 10 shown in FIG. 3, the source of polymerizing radiation comprises a light assembly 50 located in the housing 12 and structured to illuminate a first side of the tray and a substantial opposing second side of the tray with light having an intensity effective to facilitate polymerization of the polymerizable composition. The light assembly 50 comprises, for example, a plurality of light sources, for example, a first light source 50a located in the housing 12 and spaced apart from a first side of the tray 24, and a second light source 50b, spaced apart from a substantially opposing second side of the tray 24.

The system 10 is advantageously structured to expose all of the molds or mold assemblies 2 arranged on or in the tray 24 to light having an intensity effective to initiate polymerization and/or cause polymerization, for example, substantially complete polymerization, of the polymerizable composition in the molds 2.

In some systems of the present invention, the intensity of the polymerizing light at the surfaces of the tray 24 and molds 2 carried therein is no greater than about 2000 $\mu W/cm^2$.

For example, the polymerizing light comprises ultraviolet light having an intensity at the surface of the tray and the molds in a range of about 100 $\mu W/cm^2$, or about 300 $\mu W/cm^2$, or about 500 $\mu W/cm^2$ to about 700 $\mu W/cm^2$, or about 900 $\mu W/cm^2$, or about 1100 $\mu W/cm^2$. In other embodiments of the invention, the polymerizing light comprises ultraviolet light having an intensity of about 1300 $\mu W/cm^2$, or about 1500 $\mu/cm^2$, or about 2000 $\mu W/cm^2$, or about 3000 $\mu W/cm^2$, or about 4000 $\mu W/cm^2$, or about 6000 $\mu W/cm^2$ or about and 8000 $\mu W/cm^2$. In some embodiments of the present invention, the polymerizing light comprises ultraviolet light having an intensity of no greater than about 400 $\mu W/cm^2$ for example, an intensity of about 340 $\mu W/cm^2$.

In an especially advantageous embodiment of the invention, the polymerizing radiation provided by the first and second light sources 50a and 50b are structured to be effective to cause polymerization, preferably substantially complete polymerization, of substantially all of the 256 molds located in the trays 24.

Advantageously, the system 10 is structured so that the polymerizing light provided to the trays and molds carried therein is an amount that is effective to cause substantially complete polymerization of the composition in the molds. Preferably, the polymerizing light provided to the trays and molds carried therein is an amount that is less than an amount that would cause negative structural effects on the polymerized lens due to excessive lens remaining exposed to the effective light for longer than is optimal.

Still referring to FIGS. 2 and 3, each of the first light sources 50a and 50b may comprise ultraviolet light emitting elements, for example columnated lamps or UV tubes 54, arranged substantially parallel to one another, and substantially perpendicular to a length of the system 10. In a specific embodiment of the invention, each of the first light source 50a and the second light source 50b comprises between about 6 or about 10 and about 80 or about 100 or more individual lamps 54. For example, in one especially advantageous embodiment, each of the first and second light source 50a and 50b comprises about 40 lamps. Each lamp 54 may comprise, for example, an ultraviolet fluorescent lamp 54, for example, a 40 watt ultraviolet fluorescent lamp 54. Each lamp 54 may be a standard length lamp, for example, each lamp may be about 1.20 meters in length.

Preferably, the system 10 is structured such that both the first (e.g. top) surface and the second (e.g. bottom) surface of the tray 24 and the molds 2 carried therein, are exposed to polymerizing light during the polymerization process. In other embodiments of the invention, only the top surface, or alternately, only the bottom surface, of the tray or trays 24 is exposed to polymerizing light during the polymerization process.

The light assembly 50 is preferably connected to an electrical control means (not shown) for supplying suitable electric current to the lamps 54.

Turning now specifically to FIG. 3, the system 10 preferably includes a conveyor assembly 70 structured to move or transport the tray 24 through the housing 12. The conveyor assembly 70 may comprise any suitable mechanism for moving the tray 24 through the chamber 14 and between the first and second light sources 50a and 50b. The conveyor assembly 70 moves the tray or trays 24 from the inlet portion 16 to the outlet portion 18 of the housing 12 while the chamber 14 is illuminated by the light source 50, preferably by entirely all of the lamps 54 of the light source 50. Preferably, the conveyor assembly 70 and light assembly 50 are structured so as to provide substantially consistent, substantially uniform illumination to both top and bottom surfaces of the tray or trays 24 and preferably to top and bottom surfaces of each and every one of the molds 2 held in the tray or trays 24.

For example, the conveyor assembly 70 may comprise moving elements, for example, conveyor belts 72, spaced apart from each other a distance sufficient to support the tray or trays 24 preferably without causing substantial interference with, for example, substantial shadowing of, effective light provided to the molds 2, for example as the molds 2 are moved through the chamber 14. For example, the conveyor belts 72 may be located so as to support opposing peripheral portions of the tray 24. The belts 72 transport the trays 24, loaded with filled molds 2, through the illuminated chamber 14 between the inlet portion 16 to the outlet portion 18, preferably in a direction of travel that is substantially perpendicular to the longitudinal alignment of the lamps 54. In FIG. 3 the belts 72 are structured to transport the mold filled trays 24 in a direction perpendicular to the plane of the page.

The conveyor assembly 70 may comprise, for example, a plurality of conveyor elements, for example, conveyors belts 72 for accommodating one or more trays 24. In a preferred embodiment, the conveyor assembly 70 comprises a plurality of conveyor subassemblies, each subassembly being effective to carry or convey one or more trays 24 through the chamber 14. For example, in the system 10 shown, the system 10 is sized and structured to accommodate two "side-by-side" substantially parallel conveyor subassemblies 70a and 70b, wherein each of said conveyor subassemblies comprises two motor driven, spaced-apart belts 72 located between the first light source 50a and the second light source 50b.

The conveyor assembly 70 is structured so that peripheral portions or peripheral edges of the tray or trays 24 rest upon and are conveyed by opposing belts 72 during the transport of the tray 24 through the illuminated chamber 14.

A problem with light emitting elements comprising ultraviolet fluorescent tubes 54 is that the illumination intensity emitted by such tubes tends to be inconsistent. Usually, illumination intensity tends to decrease from the center of the tube, where the illumination is most intense, toward the end portions of the tube, where the illumination is less intense. Generally, each tube typically has at least one region emitting a maximal level of radiation intensity and flanking regions of lesser intensity.

Thus, it can be appreciated that molds 2 disposed or transported in alignment with end portions of the tubes or lamps will generally experience lower light intensity than those molds 2 disposed or transported in alignment with the central portion of the tube. Thus, molds in the tray 24 passing beneath the end portions of the fluorescent tubes may "see" a different intensity than more centrally located molds in the same tray 24.

Inconsistencies between different molds cured in a single batch are generally undesirable. Structure is preferably provided, such as the optical surfaces described elsewhere herein, to ensure that the effectiveness of the cure process will not be dependent on where the mold is positioned relative to its location on the tray 24. Preferably, the system 10 is structured such that each of the filled and closed molds on the tray will experience substantially the same intensity of ultraviolet light as each other of the filled and closed molds. As discussed herein, such uniform or substantially uniform light exposure can provide benefits in terms of consistency and quality of the polymerized lenses.

It is an object of the invention to provide a system that provides uniform, consistent illumination to the plurality of molds 2 on the tray or trays 24, such that each and every filled mold "sees" or is exposed to the same intensity of light for the same duration of time, and thus every mold assembly 2 is subjected to substantially identical polymerization or curing conditions.

In an important aspect of the invention, the system 10 includes structure for effecting consistency, for example, uniformity of illumination intensity provided to the molds 2.

For example, the system 10 may comprise one or more optical surfaces within the housing that are effective to reflect light from the lamps in a manner that will promote the desired substantially consistent illumination intensity. Such optical surfaces may be provided by one or more reflective elements disposed within the housing. If a plurality of reflective elements are provided, the elements may have one or more different reflectivities, or may have the same reflectivities but are located in different positions with respect to the light sources.

For example, in some embodiments of the present invention, the system 10 includes multiple reflecting surfaces positioned in the housing so as to provide a more consistent, preferably more uniform exposure to the light from the light sources to the tray, relative to an identical system with only a single, uniform reflecting surface. For example, in some embodiments of the invention, optical surfaces disposed adjacent the tube end portions have a greater reflectivity relative to optical surfaces disposed adjacent the central portion of the tube. In an especially advantageous embodiment of the present invention, one or more reflecting elements disposed above the tube end portions are selected to have about 9.75% more reflectivity than the reflecting elements disposed above the intermediary or central portion of the tube.

Figure 4:
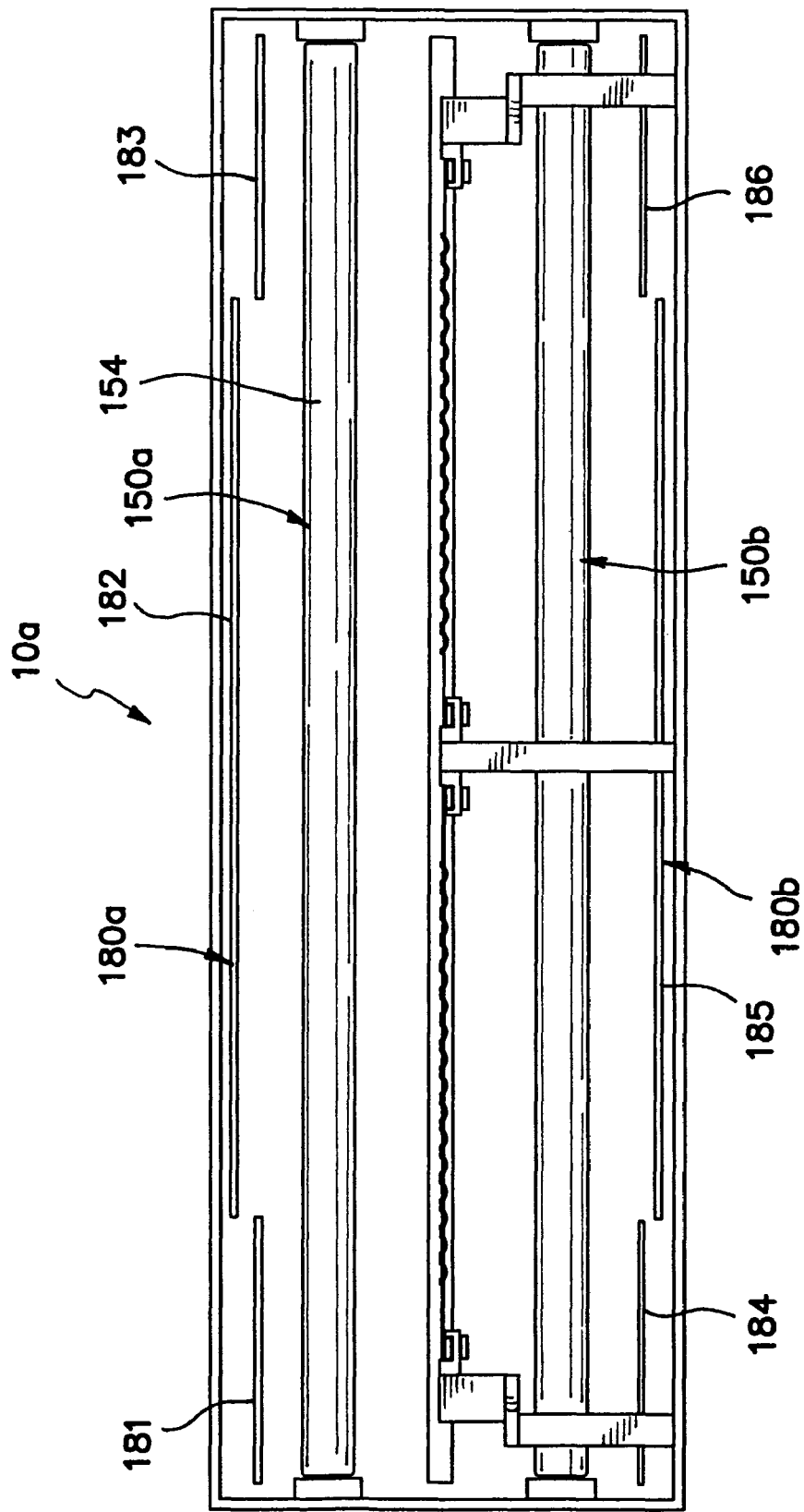
FIG. 4 is a cross-sectional view similar to the cross-sectional view in FIG. 3, of another system in accordance with the invention, wherein the system includes optical surfaces spaced apart at different distances from the light source in order to enhance consistency of illumination intensity in the housing chamber.

In the system 10 shown in FIGS. 2 and 3, the system 10 advantageously comprises structure, for example one or more optical surfaces 80, for enhancing consistency, preferably enhancing uniformity, of polymerizing light intensity provided to the tray 24 and the molds 2 carried thereby. As shown in FIGS. 2, 3 and 4, the optical surfaces are spaced apart from the contact lens molds and are, therefore, separate and different from the surfaces on contact lens molds. The optical surfaces 80 may comprise any suitable structure for achieving, or at least enhancing, effectiveness of the polymerization, for example, by enhancing consistency of the illumination provided to the molds 2 as the molds 2 are moved through the housing 12.

The optical surfaces 80 may comprise reflective elements 80a and 80b located within the housing 12, for example, above and below the first and second light sources 50a and 50b respectively.

The reflective elements 80a and 80b may be made of reflective materials, for example, one or more metallic materials, for example, aluminium, for example aluminium sheets. As shown in FIG. 3, the reflective elements 80a and 80b are spaced apart from the light sources 50a and 50b respectively. Advantageously, the reflective elements 80a and 80b are located at positions selected to achieve substantially consistent intensity of light provided by the first and second light sources 50a and 50b to the molds 2, for example, in order to provide substantially optimal cure conditions within the housing 12.

FIG. 4 is provided to illustrate a variation of this feature of the invention. Specifically, FIG. 4 shows a system 10a of the present invention which is similar to system 10. A primary distinction between system 10a and system 10 is that in system 10a, optical surfaces 180 are provided which comprise a first plurality of reflective surfaces 180a and a second plurality of reflective surfaces 180b. The first plurality of reflective surfaces 180a comprises, for example, reflective elements 181, 182, 183 spaced apart from the first light source 150a at variable distances. For example, peripherally located reflective elements 181 and 183 are located closer to the lamp 154a than intermediately located reflective element 182. In this particular system 10a shown, reflective elements 181 and 183, disposed adjacent end portions of the tube 154a, are positioned closer to the tube 154 than reflective surface 182, which are disposed adjacent a central portion of the tube 154a. The variation in spacing of the reflective surfaces 181, 182, 183 relative to the lamp 154 is preferably selected to optimize uniformity of illumination intensity at the surfaces of the mold assembly 2.

Similarly, a second plurality of reflective surfaces 180b, comprising reflective elements 184, 185, 186, are spaced apart at variable distances from the second light source 150b. More specifically, for example, peripherally located reflective elements 184 and 186 are disposed closer to lamps 154b than intermediately located reflective element 185.

In some embodiments, one or more of the optical surfaces comprises an aluminum sheet having a selected reflectivity based on the grade of the aluminum. Aluminum sheets are commercially available, for example, from supplier Alanod Ltd, Chippenham Drive, Kingston, Milton Keynes MK10 OAN, United Kingdom which provides aluminum sheets in different grades. Such sheets are typically identified by grades including grade 9040 GP, grade 412 GS, grade 610 G3, grade 620 G grade 1100 G, and grade 4270 AG.

Other reflecting elements may also be utilized within the scope of the present invention. For example, a sheet made of a material selected from PTFE, Polycarbonate, and Bright Annealed Steel can be utilized to provide a desired reflectivity.

The following description provides examples of variations or ranges of illumination intensity in the present systems when the systems include reflecting elements having different reflectivities, or different relative reflectivities.

Figure 4A:
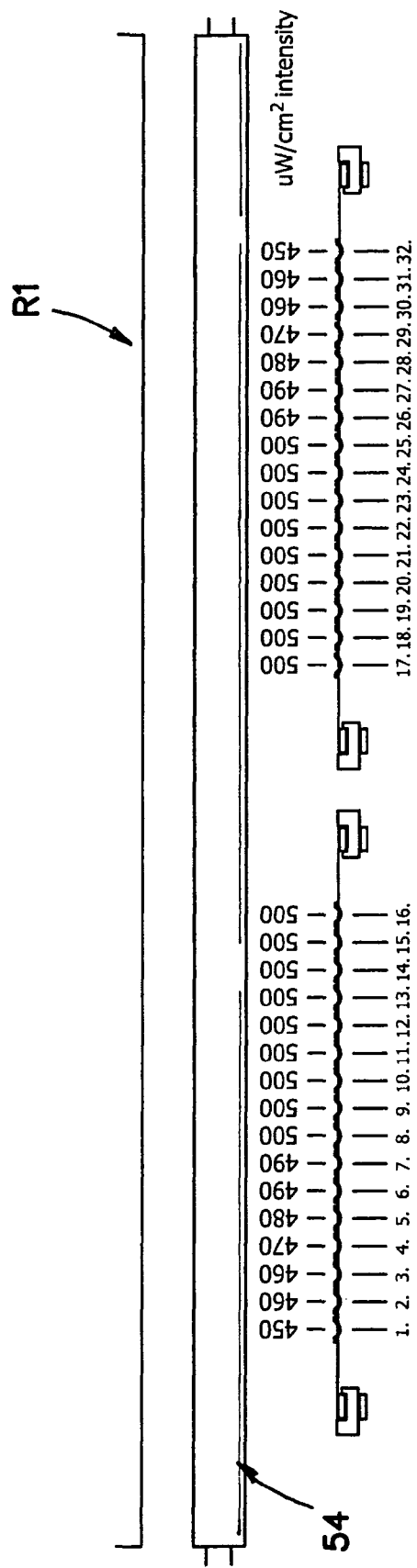
FIG. 4A is a diagram of illumination intensity values at surfaces of a plurality of molds spaced apart from an ultraviolet lamp, and the intensity of the lamp is set at 500 µW/cm² and an optical surface is provided above the lamp which comprises a single reflectivity.

FIG. 4A shows a diagram of illumination intensities at top surfaces of 32 molds (numbered 1-32) aligned along an ultraviolet lamp tube 54 that is set to deliver ultraviolet light at 500 $\mu$W/cm$^2$. In this embodiment, a reflecting surface R1 made of a single grade of a reflective aluminum sheet is provided in a spaced apart relationship with the ultraviolet lamp. The aluminum sheet has a grade of 610 G3. It may be understood that in this system, the system comprises an optical surface having a single reflectivity. As shown, there is a variation in the illumination intensity that is measured at the mold surfaces. This variation ranges from a minimum illumination intensity of about 450 $\mu$W/cm$^2$ adjacent the end portions of the tube 54 (molds numbered 1 and 32) to a maximum of about 500 $\mu$W/cm$^2$ adjacent the center portion of the tube 54 (molds numbered 8 through 25). Thus, it can be appreciated that the plurality of filled molds are not being exposed to uniform, consistent illumination of ultraviolet light.

Figure 4B:
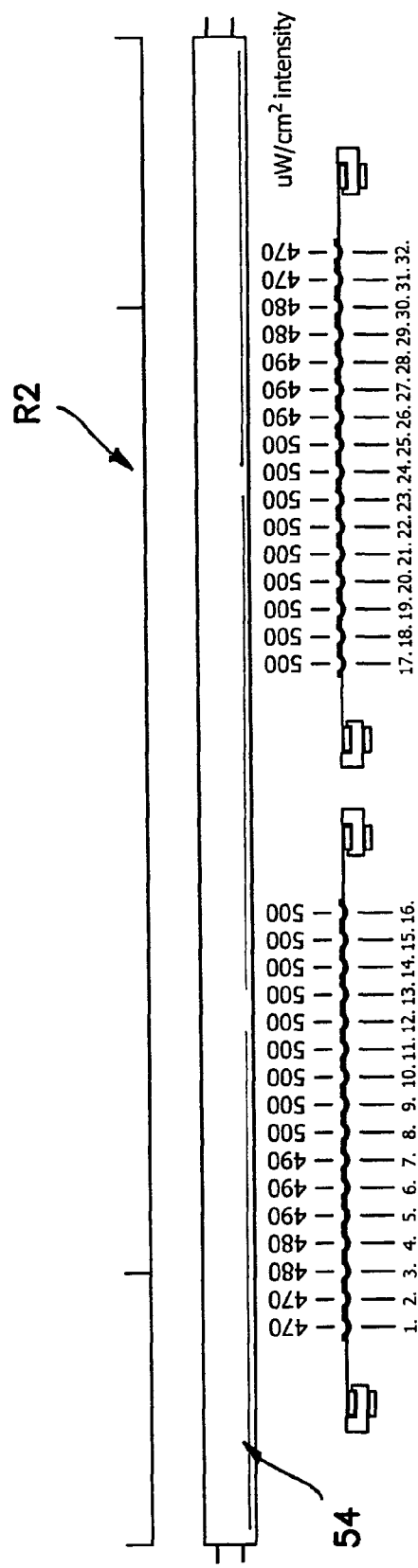
FIG. 4B is a diagram similar to FIG. 4A, except that the optical surface comprises two different reflectivities.

FIG. 4B shows a diagram of illumination intensities at surfaces of 32 molds (numbered 1-32) aligned along an ultraviolet lamp tube 54 that is set at 500 $\mu$W/cm$^2$. In this embodiment of the invention, a reflecting surface R2 is provided which comprises two different grades of aluminum sheet. More particularly, the reflecting surface R2 is made of an aluminum sheet having grade 610 G3 adjacent a center portion of the tube, and aluminum sheets both having grade 4270AG adjacent end portions of the tube 54. It may be understood that this system comprises an optical surface with a plurality of different reflectivities or optical properties. As indicated, there is a variation in the illumination intensity that is measured at the mold surfaces. This variation ranges from a minimum of about 480 $\mu$W/cm$^2$ adjacent the end portions of the tube (molds numbered 1 and 32) to a maximum of about 500 $\mu$W/cm$^2$ adjacent the center portion of the tube (molds numbered 4 through 29).

It can be appreciated upon comparison of FIG. 4A and FIG. 4B, that although the plurality of filled molds are not being exposed to uniform, consistent illumination of ultraviolet light, the variation of illumination intensity is significantly less in the embodiment of the invention shown in FIG. 4B, than the variation of illumination intensity of the system shown in FIG. 4A. Moreover, a greater number of molds are exposed to the maximum illumination intensity (500 $\mu$W/cm$^2$) relative to the number of molds exposed to the maximum illumination intensity in the system shown in FIG. 4A.

Figure 4C:
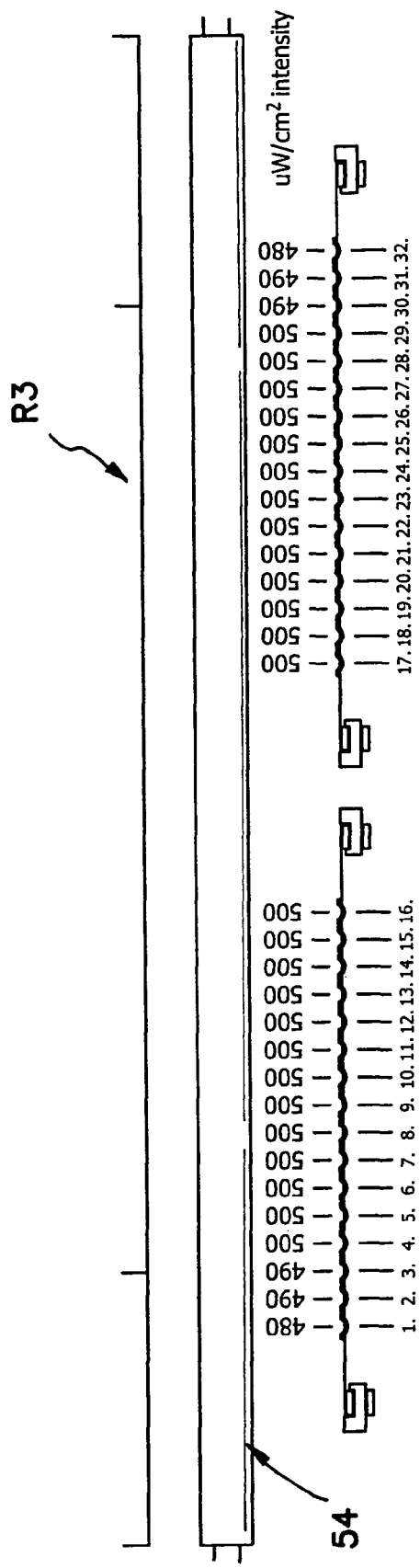
FIG. 4C is a diagram similar to FIG. 4B except that the optical surface comprises two other reflectivities.

FIG. 4C shows a diagram of illumination intensities at surfaces of 32 molds (numbered 1-32) aligned along an ultraviolet lamp tube that is set at 500 $\mu$W/cm$^2$. In this embodiment of the invention, a reflecting surface R3 is provided which, like the set up in Example 4C, comprises two different grades of aluminum sheet. However, reflecting surface R3 comprises an aluminum sheet having grade 610 G3 adjacent a center portion of the ultraviolet emitting tube 54, and aluminum sheets both having grade 9040GP adjacent end portions of the tube. As indicated, there is a variation in the illumination intensity that is measured at the mold surfaces. This variation ranges from a minimum of about 470 $\mu$W/cm$^2$ adjacent the end portions of the tube 54 (molds numbered 1, 2, 31 and 32) to a maximum of about 500 $\mu$W/cm$^2$ adjacent the center portion of the tube 54 (molds numbered 8 through 25).

It can be appreciated from FIGS. 4A, 4B, and 4C, that illumination intensity is relatively more uniform at the mold surfaces in the system shown in FIG. 4B. The range of intensity along the ultraviolet tube in FIG. 4A is from 450 $\mu$W/cm$^2$ to 500 $\mu$W/cm$^2$ whereas the range of intensity along the ultraviolet tube in FIG. 4C is from 470 $\mu$W/cm$^2$ to 500 $\mu$W/cm$^2$.

Turning back to FIG. 3, in one embodiment of the invention, each of the reflective elements 80a and 80b comprises a first reflective surface R1 disposed adjacent end portions of the light emitting elements 54 and a second reflective surface R2 disposed adjacent a central portion of the light emitting elements, wherein the first reflective surface R1 has a higher reflectivity than the second reflective surface R2.

In a preferred embodiment of the invention, two first reflective surfaces R1 are provided, each being disposed adjacent end portions of the fluorescent lamps, and each having a reflectivity that is about 6% to about 10% higher than a reflectivity of the second reflective surface R2 located adjacent a central portion of the fluorescent lamps, the first and second reflective surfaces being about equidistantly spaced from the lamps. More preferably, the first reflective surfaces R1 have a reflectivity that is at least 6.75% higher than a reflectivity of the second reflective surface R2. Even more preferably the first reflective surfaces R1 have a reflectivity that is about 9.75% higher than a reflectivity of the second reflective surface R2.

The following Table 7 shows direct comparisons of reflector materials. This Table is provided in order to identify differences in the different materials useful as reflecting elements in the systems of the present invention. The maximum ultraviolet intensity seen at the mold tray was measured for each of the different reflector materials. For each material the reflecting element was placed at two different distances behind or spaced apart from the ultraviolet tube.

There are generally two categories of surface finish, either matte or specular. A matte surface finish gives a diffuse type of reflection. A specular surface finish gives a mirror-type of reflection. The term "optical surface" as used herein, refers to any surface used to control distribution of light within the chamber of the system. This term is intended to encompass a range of surfaces, including but not limited to surfaces having very low reflectivity values and surfaces having very high reflectivity values.

In one aspect of the present invention, a diffuse surface for the main reflector is preferred because a diffuse reflection generally breaks up the directional component of the light, thereby providing more uniform illumination within the housing chamber.

In another aspect of the invention, one or more different low reflectivity surfaces are provided, and are sometimes used in conjunction with more highly reflective surfaces.

Table 7 shows the maximum ultraviolet intensity recorded at the filled mold tray when a reflective surface is placed at a distance of either 0 mm or about 40 mm above the ultraviolet lamps. The tray is positioned at about 72.5 mm below the lower surface of the ultraviolet lamps. The ultraviolet lamps are 40 watt lamps that are set at maximum power. The intensity is recorded at about the mid-point of the lamp.

TABLE 7

| Material | Reflector Distance from Lamp Surface | | Finish |
| --- | --- | --- | --- |
| | 0 mm | 40 mm | |
| None | 1370 | 1370 | — |
| Bright annealed steel | 1800 | 1830 | mat |
| * 1100 G | 2070 | 2100 | mat |
| * 610 G3 | 1980 | 2050 | mat |
| * 620 G | 1980 | 2020 | mat |
| * 9040 GP | 2160 | 2190 | patterned |
| * 412 GS | 2260 | 2300 | specular |
| * 4270 AG | 2240 | 2250 | specular |
| PTFE | 1930 | 1950 | mat |
| Polycarbonate | 1430 | 1420 | mat |
| Maximum oven intensity Values in µW/cm2 | | | |

* = aluminium sheet

Figure 4D:
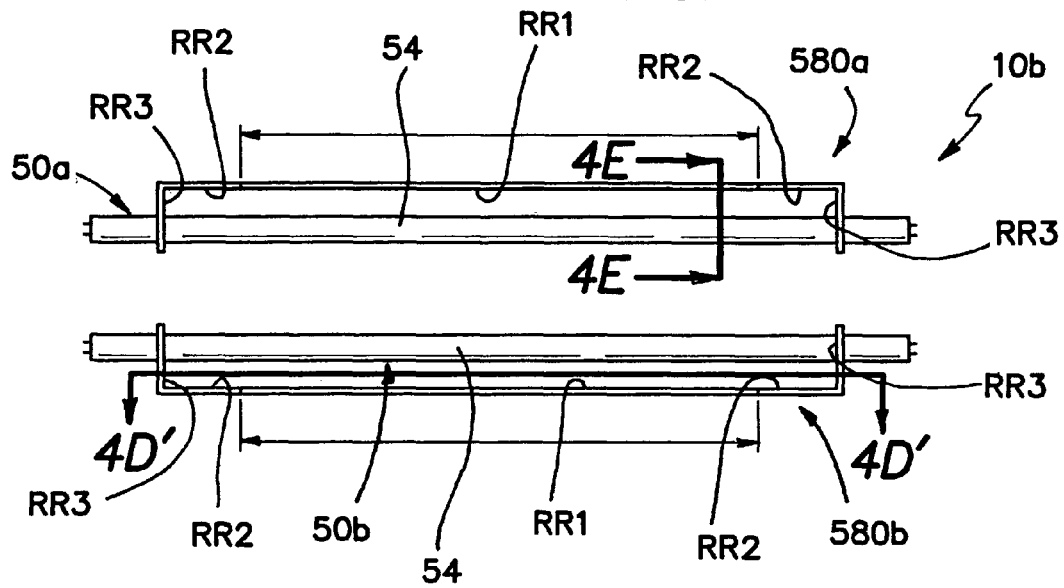
FIG. 4D is a simplified cross-sectional view of an advantageous embodiment of the invention having optical surfaces with different reflectivities.
Figure 4D:
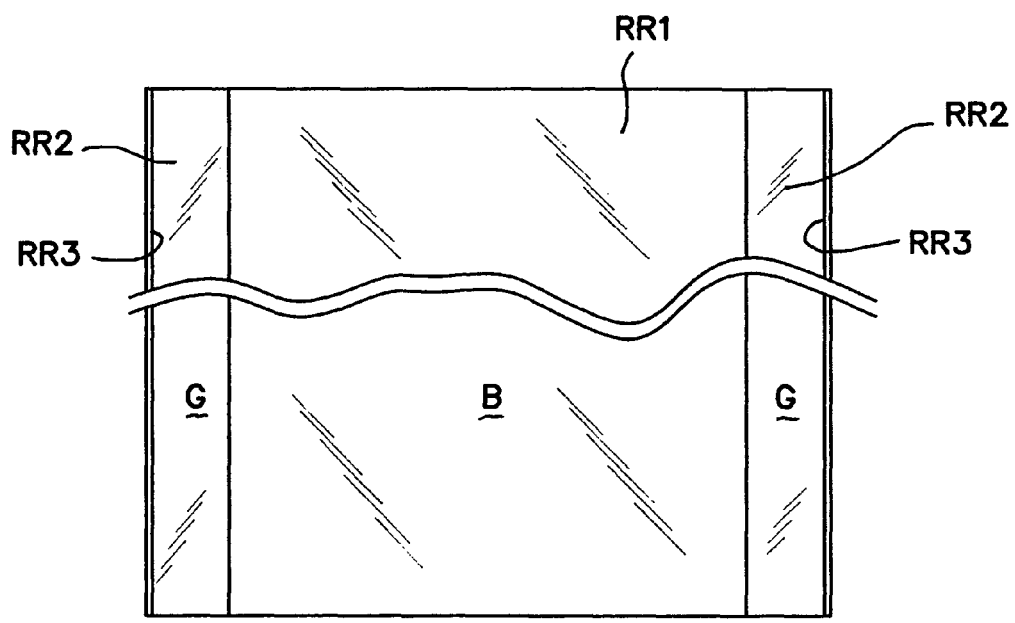

An especially advantageous system 10B of the invention is shown, in part, in FIG. 4D. Unless otherwise indicated herein, system 10B is substantially the same as system 10. Generally, FIG. 4D illustrates a front cross sectional view of the system somewhat similar to the view shown in FIG. 4. Like system 10 and 10A, system 10B includes upper and lower light sources 50a and 50b, each including a plurality of light emitting tubes 54, and a conveyor assembly (not shown) for moving left and right trays 24 containing molds (not shown) through the housing (not shown). The trays 24 are being moved in a direction generally perpendicular to the page.

Optical surfaces are provided which are structured and positioned to be effective to promote substantially uniform distribution of light onto the trays, for example, onto top and bottom surfaces of the trays.

In this specific example, the optical surfaces comprise of upper optical surfaces 580a and lower optical surfaces 580b. Each of upper and lower optical surfaces 580a and 580b, respectively, comprises a first optical surface RR1 having a first reflectivity, and at least one second optical surface RR2 having a second reflectivity that is greater than the first reflectivity.

Optionally, the first optical surfaces 580a and/or the second optical surfaces 580b may further include a third optical surface RR3, having a third reflectivity. In this specific example, third reflectivity is greater than the second reflectivity.

For example, the first optical surface RR1 is preferably between about 0% and about 30% reflective. For example, the first optical surface RR1 may have 0% reflectivity. More specifically, the first optical surface RR1 may comprise, for example, a Matte Black painted surface.

The second optical surface RR2 is preferably between about 10% and about 50% reflective, or greater. For example, the second optical surface RR2 may have about 30% reflectivity. More specifically, the second optical surface RR2, may comprise, for example, a Matte Gray painted surface.

Both first and second optical surfaces RR1 and RR2 may comprise substantially planar surfaces, disposed, for example, in a plane substantially parallel to and substantially uniformly spaced apart from the light sources 50a and 50b, respectively. Optical surfaces RR1 and RR2 may comprise any suitable material and structure, for example, optical surfaces RR1 and RR2 may comprise a layer of paint, film, coating, or the like, for example, located on or adjacent to top and bottom inner walls of the housing. The optical surfaces may thus be a layer or coating disposed on a rigid substrate, such as a metal sheet.

The third optical surface RR3, if provided, is preferably a metallic surface having a relatively high reflectivity compared to second optical surface RR2. For example, third optical surface RR3 may comprise an Alanod Micro Silver 4270 reflective surface.

Figure 4E:
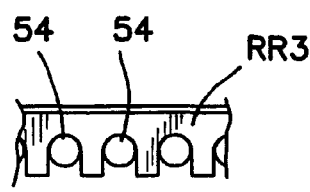
FIG. 4E is a side view of a portion of the system shown in FIG. 4D, showing a reflector having slots for receiving end portions of UV lamps.

The third optical surfaces RR3 are disposed so as to face generally inwardly into the housing chamber and toward the moving trays, for example, in a direction substantially perpendicular to the lamps. As shown in FIG. 4E, optical surfaces RR3 may include slotted regions sized and shaped to receive a circumferential region of the lamps 54. The slotted structure facilitates lamp replacement.

FIG. 4D' shows a plan view of the optical surfaces along line 4D'-4D' in FIG. 4D. It can be seen that in this embodiment, the optical surfaces RR1, RR2, and RR3 are provided in a plurality of strips that are parallel to the direction of movement of the trays carrying the molds. Surface RR1 is Matte Black, and surfaces RR2 and RR3 are Matte Gray, as discussed herein. In one embodiment, in which the ultraviolet lamps are about 3 feet long, the RR3 regions have a width of about 10 inches, and the RR2 region has a width of about 16 inches. However, these values are provided by way of illustration and should not be construed to limit the invention.

The optical surfaces used in the present systems are preferably positioned and structured to achieve at least one of, and preferably all of, the following objectives: provide a means, for example a mechanism, for compensating for the natural loss in lamp intensity near the lamps ends; reduce the occurrence of light from the lower lamps from being reflected by the surfaces behind the upper lamps; reduce the occurrence of light from the upper lamps from being reflected by the surfaces behind the lower lamps; and provide a substantially even light intensity distribution over the surfaces of the trays regardless of the number of trays are on the conveyor and/or the positioning of the trays on the conveyor. Thus, it can be understood that the present systems include one or more elements or features that are effective in providing a desired or predetermined amount of controlled illumination of the mold assemblies 2.

Thus, the system lob can be understood to include a conveyor for moving a plurality of trays through a housing for polymerization of lens precursor materials disposed in molds arranged on the trays. The light assembly includes ultraviolet lamps disposed both above and below the trays carrying the molds.

This arrangement gives rise to certain considerations regarding the optics in the system, particularly when the system is configured to be used for polymerizing lenses using especially low intensities of ultraviolet light, for example, as described elsewhere herein. In such systems in accordance with the invention, tight control of the light provided to the molds during the manufacturing process will promote consistency in quality of the lenses produced.

Gaps between adjacent trays moving along the conveyor (such as shown, for example, in FIG. 6) may cause or be associated with inconsistent illumination provided to edge portions of the trays. For example, it can be determined that when highly reflective aluminum surfaces are used behind the lamps to reflect light from the lamps as described elsewhere herein, the gaps can cause leading and trailing edges of the upper surface of each of the trays to be exposed to reflections from the lamps beneath the trays. In a similar manner, leading and trailing edges of the lower surface of each of the trays are exposed to reflections from the lamps above the trays.

In order to reduce or minimize these undesirable reflection effects, the optics of the system are modeled using a light ray tracing software package manufactured and sold under the name Photopia. A ray tracing analysis is performed and results of the analysis indicate that the effects described above could be minimized, or at least reduced, for example, substantially reduced, by using optical surfaces having relatively low reflectivity.

It is still deemed desirable that compensation is made for the loss in lamp intensity near the lamp ends in the system. As mentioned elsewhere herein, a characteristic of a typical fluorescent tube is that light intensity emitted near end regions of the tube is relatively lower than light intensity emitted in a more central region of the tube. Consequently, filled closed molds under the end regions of the tube would experience lower light intensity than those under the central region of the tube. In order to compensate for this variation along the length of the tube, it is determined that uniformity of light could be promoted by adding optical surfaces adjacent, for example behind, the tube ends having a relatively higher degree of reflectivity.

Computer simulations using the ray tracing software package Photopia show that a combination of a Matte Black surface with about 0% reflectivity and a Matte Grey surface with about 30% reflectivity arranged as shown in FIG. 4D and FIG. 4D', with the lamps being powered at about 60% output, can meet the above objectives. The arrangement may also include side reflectors arranged as shown in FIG. 4E in order to further improve the optics in the system.

After the changes are made to the system using the appropriate optical surfaces in appropriate locations, the ray tracing analysis can again be performed, to determine if substantially consistent illumination intensity is provided to each of the trays or molds located on the trays moving through the housing regardless of the number of trays or the positioning of the trays.

In accordance with another aspect of the present invention, the system 10 is structured to provide that each of the filled molds are substantially instantly, or substantially instantaneously, illuminated with effective light having the correct intensity when polymerization is initiated. Likewise, the system is structured such that each of the molds is substantially instantly, or substantially instantaneously, removed from exposure to effective light when polymerization is complete, or substantially complete. In other words, the system is designed such as to provide means, for example mechanisms, for effecting substantially instantaneous commencement and substantially instantaneous termination of effective light, for example, optimally effective light.

In certain embodiments, the nearly instantaneous exposure of the mold assemblies to the radiation or ultraviolet light can be provided by one or more of the following: light shields, such as fixed panels, moveable gates, and the like, and tray moving devices, such as dragging mechanisms that provide a faster rate of movement relative to the conveyor system of certain of the present systems.

Figure 5:
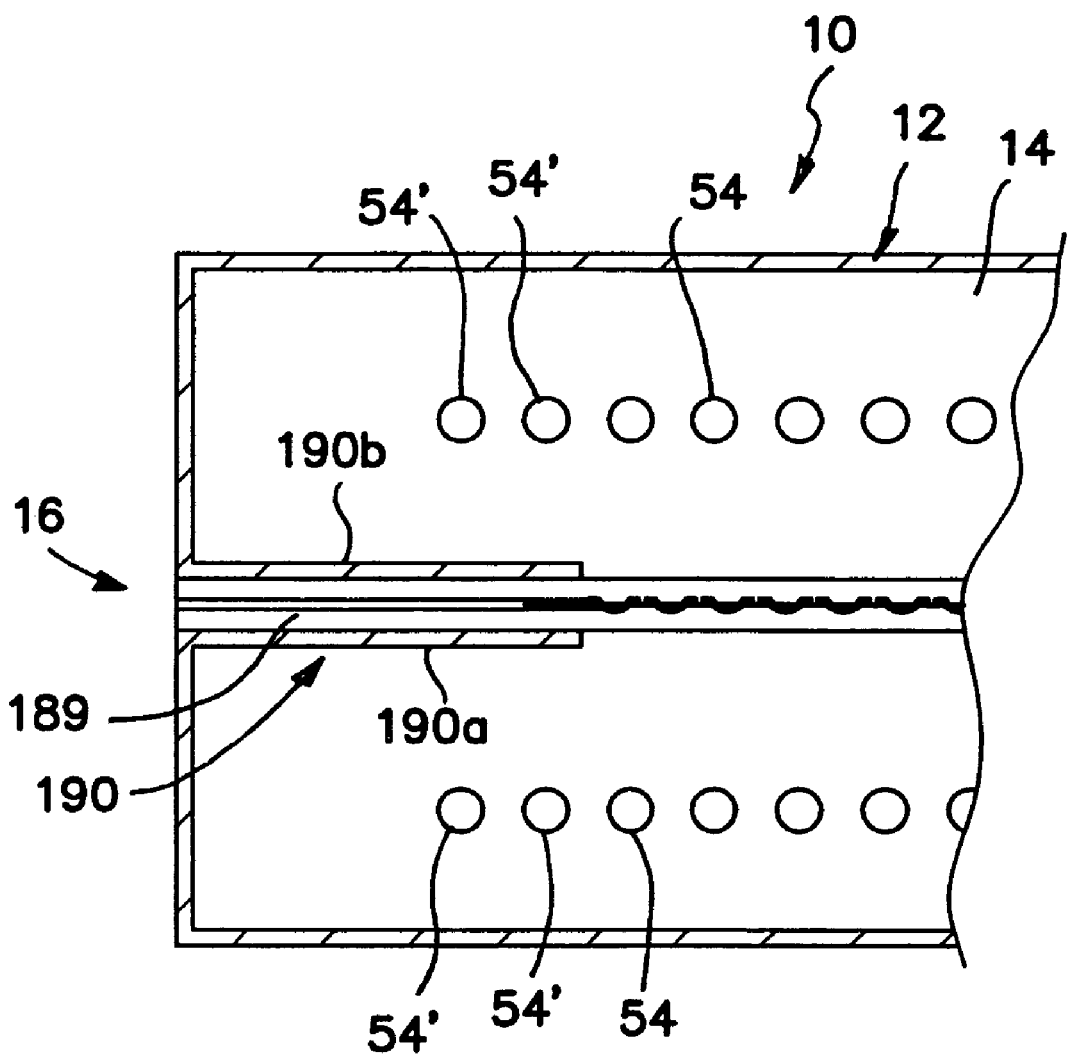
FIG. 5 is another cross-sectional view of the system shown in FIG. 2, illustrating a "letter-box" style inlet for shielding the molds, and polymerizable composition therein, from experiencing regions of illumination intensity less than the desired illumination intensity.

For example, another advantageous feature of the system 10 is shown in simplified cross-sectional view in FIG. 5. As illustrated, housing 12 is structured such that inlet 16 provides a substantially shaded region 189 within the housing 12. More specifically, the substantially shaded region 189 is a region within the housing 12 that is shielded from experiencing regions of illumination intensity less than a desired illumination intensity.

For example, in a preferred embodiment of the invention, the inlet portion of the housing is structured to shield the tray from receiving effective light (i.e. light having an illumination intensity effective to cause, initiate or otherwise effect polymerization of the composition contained in the molds) when the tray is located in the inlet portion. The inlet portion may comprise an enclosable vestibule sized to contain at least one tray. The interior of the vestibule is shielded from light from the interior of the illuminated portion of the housing by means of a barrier, for example, a moveable gate, such as a pneumatically controlled gate, that can be opened, for example automatically opened, to facilitate movement of the mold filled tray onto the conveyor and into the illuminated portion of the housing.

Preferably, the outlet portion of the housing comprises a similar enclosable vestibule for preventing overexposure of the mold assemblies to effective light after the composition has been cured.

Another feature of the invention for preventing premature exposure and/or overexposure of molds to effective light comprises an inlet shielded region located inward from the inlet vestibule and an outlet shielded region located inward from the outlet vestibule.

For example, housing 12 may be structured to provide a region 189 at each of the inlet 16 and outlet (not shown in FIG. 5) within the housing 12 which is shielded from effective light. In other words, region 189 receives substantially no light that is effective to cause or initiate polymerization of the polymerizable composition contained in the molds when the molds are located in region 189.

More specifically, housing 12 may include a "letter-box" type inlet 16 and/or outlet, comprising preferably inwardly extending structure 190, disposed between peripheral regions of the light source 50 emitting elements 54' and the molds 2 on or in the tray 34 when the tray 34 is located within the shielded region 189.

More specifically, shield structure 190 may include upper shield portion 190a and lower shield portion 190b each of which extends inwardly into the housing 12. The shield portions 190*a* and 190*b* are spaced apart by a distance sufficient to allow passage of a mold filled tray between the shield portions 190*a* and 190*b*.

Preferably, at least one light emitting tube 54', for example, two light emitting tubes 54', are located immediately above shield portion 190*a* and, similarly, at least one light emitting tube 54', for example, two light emitting tubes 54', are located below inwardly extending shield portion 190*b*.

The advantages of the shield structure 190 might be better understood as follows. The illumination intensity adjacent each lamp 54, for example under each lamp 54 of the first light source 50*a* for example, is reinforced by the two lamps that are directly adjacent or flanking each side of the lamp. As a result, the illumination intensity under the peripherally located lamps, or end lamps, for example lamps 54', is less than the illumination intensity under the more centrally located lamps, in that the peripheral lamps 54' do not have two directly adjacent flanking lamps on one side thereof.

As a result, without the shield structure 190, system 10 would include a fully illuminated portion of the housing chamber 14 between the centrally located lamps flanked by peripheral regions or end regions of relatively lower illumination intensity. Because the molds must pass into the opening 16 there is a risk that the molds would be exposed to this region of lower illumination intensity. As a result of being exposed, even briefly exposed, to this lesser region of illumination intensity, the molds may not polymerize correctly. The shield structure 190 provides one effective means of reducing the potential that one or more of the molds would be exposed to illumination intensity that is different from, for example, is less than, the most effective or optimal illumination intensity. Shield structure 190 is provided to effectively "shade" the molds from receiving any significant premature exposure to the lower intensity light, particularly, for example, when the molds are in the process of passing into, or out from, the fully illuminated portion of the chamber 14.

For example, turning now to FIGS. 2 and 6, the system 10 shown, includes about forty ultraviolet lamps 54 or tubes arranged above the conveyor assembly 70 and about forty ultraviolet lamps 54 arranged below the conveyor assembly 70.

Figure 7A:
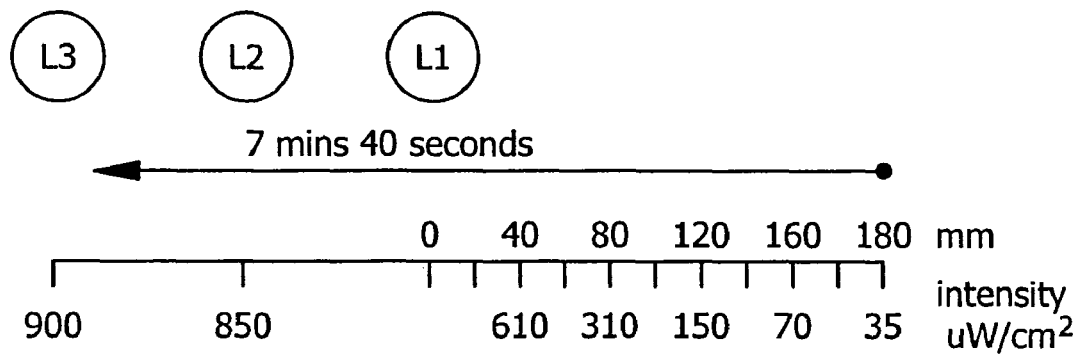
FIG. 7A is a diagram showing illumination intensities at mold surfaces as measured at different distances along the conveyor assembly beneath the first three lamps in a system of the present invention.
Figure 7B:
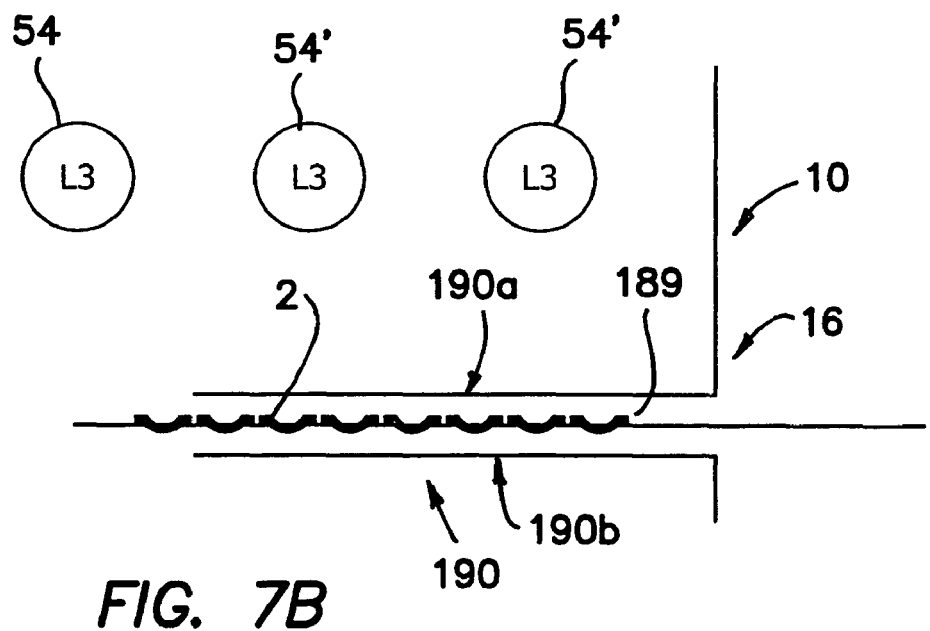
FIG. 7B is a diagram showing an advantage of providing the "letter-box" style inlet shown in FIG. 5.

FIGS. 7A and 7B illustrate the effectiveness of the shield structure 190 feature of embodiments of the present systems. FIG. 7A shows a diagram of illumination intensities without the shielding feature. At the inlet to the system, the molds approach lamp 1 (L1) along conveyor (in this case, moving from right to left). The scale shows, in units of $\mu W/cm^2$, the ultraviolet intensity level measured at certain points along the conveyor provided by the first three lamps in a 40 lamp arrangement. The target illumination intensity is 900 $\mu W/cm^2$. The scale shows that the illumination intensity under the 1st and 2nd lamps (L1 and L2) and along the approach to L1, (0 to 180 mm) the illumination level is significantly below the target illumination intensity level of 900 $\mu W/cm^2$.

Turning now to FIG. 7B, the letter-box design, or shield structure, of the inlet portion 16 shields each filled closed mold assembly 2 from the lower intensity ultraviolet light (illumination intensities of less than 900 $\mu W/cm^2$, for instance) until the mold assembly 2 reaches the 3rd lamp. Advantageously, the letter-box design still allows light from the 1st and 2nd lamps to reinforce light from the 3rd lamp. Therefore, it can be appreciated that when under the 3rd lamp, each filled closed mold is exposed to ultraviolet light with the correct intensity in a substantially instantaneous manner.

It is to be appreciated that the inwardly extending structure 190 that makes up the letter-box inlet may sometimes extend not as far as, or further into the housing chamber than shown and specifically described herein, so long as the areas of lower ultraviolet intensity are shielded from reaching the molds by such inwardly extending structure. Such other arrangements are considered to be within the scope of the present invention.

In yet another aspect of the present invention, the system 10 preferably is structured such that the edge belt conveyor assembly components, for example, the belt supports, do not substantially shield the filled molds 2 on the edges of the tray from receiving the correct or desired or predetermined light intensity. In the embodiment of the invention shown in FIG. 3, the edge belt conveyor assembly 70 is constructed using outriggers and supports that are structured to position the tray 24 away from the peripheral support components of the system 10 in order to provide reduced illumination shielding.

Figure 8:
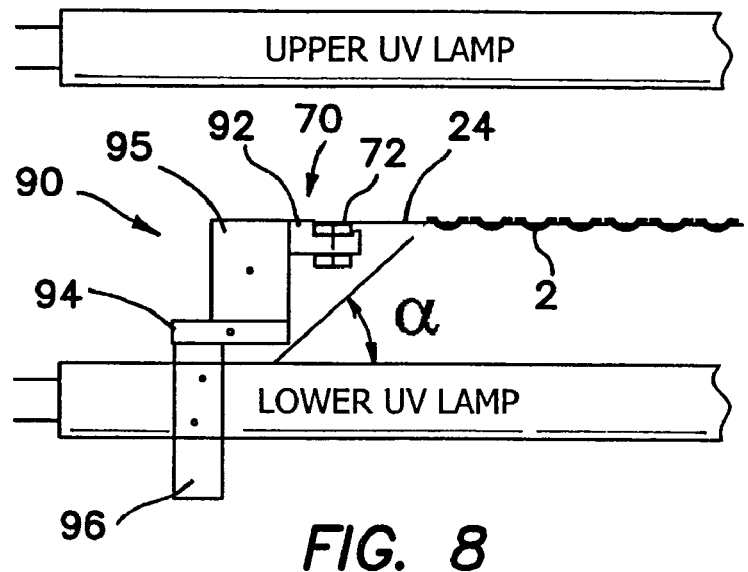
FIG. 8 shows conveyor assembly support structure that optimizes illumination intensity in the housing chamber by reducing occurrence of shadows or shielding by components of the conveyor assembly.

Reduced illumination shielding within the chamber 14 can be accomplished by any suitable structural means, one of which is shown in FIG. 3 and in diagrammatical form in FIG. 8. The edge belt conveyor assembly 70 includes first and second outriggers 92, 94 connected to support posts 96. Support post 96 is one of a plurality of spaced apart posts that holds support beam 95 that runs the length of the system. The support beam 95 supports the first outrigger 92 which hold the conveyor belt 72. The support beam 95 is mounted to the spaced apart support posts 96 by second outrigger 94 which extends away from the side wall of the housing.

The advantages of this structure may be more greatly appreciated by referring to FIG. 8. In diagrammatical form, it can be seen that the first and second outriggers 92, 94 are substantially perpendicular to the supports 95, 96 and effectively position the molds in a region of full illumination. This assembly is effective to prevent any substantial illumination shielding or shadowing from occurring on the molds due to the presence of the various components of the conveyor assembly 70. This structure eliminates, or at least reduces, any shielding of the filled molds from the polymerizing light.

The same principles of optimal illumination and reduced illumination shielding could be applied to the construction of other parts or components of the system 10 in accordance with the present invention.

Referring now specifically to FIG. 3, a central conveyor support 98 is provided so as to be sized and shaped to reduce the occurrence of shielding of the filled molds within the interior of the system 10. In this embodiment, the central support 98 includes spaced apart main support posts 98*a* having outriggers 98*b* (only one support post 98*a* and outrigger 98*b* is shown in this view). These posts 98*a* are situated at regular intervals and supporting the structure above them. The structure above them includes a support beam 98*c* that runs the length of the system 10.

Along the length of the central conveyor support 98 there are both left handed support posts 98*a* and right handed support posts. They alternate left handed, right handed, left handed, right handed, etc. A cantilever 98*d* is mounted on top of the intermediate support beam 98*c* as shown. The cantilever 98*d* includes a right hand arm and a left hand arm, each of which supports a conveyor belt 72 as shown.

In order to provide an effective cure of the lens precursor monomer composition in the molds, it is preferable that the commencement and termination of illumination of the molds is substantially instantaneous. Instantaneous and consistent illumination is particularly important at the commencement or the beginning of the cure because it is believed that many of the important lens properties are determined in the first few minutes of the curing cycle. As mentioned elsewhere herein, it is also preferable that the system be designed so as to maintain a consistency of illumination intensity throughout the cure period.

Another important consideration given to the design of the system 10 of the present invention is the benefits of achieving instantaneous illumination, the benefits of which are described elsewhere herein, for each mold when the mold is first placed on the conveyor assembly 70. In some embodiments of the invention, the conveyor assembly travels at a speed of about 2 meters per hour to about 5 meters per hour, for example at about 3 meters per hour.

In embodiments of the invention in which the conveyor assembly 70 moves the tray 24 through the housing 12 at only approximately 3 meters per hour, this means that it will take an individual filled contact lens mold, with a diameter of about 20 mm, about 24 seconds to move through the entrance to the fully illuminated region of the chamber 14. Similarly, it will take about the same length of time for the mold to leave the fully illuminated region of the chamber 14. The filled mold would therefore not be exposed to the desired instantaneous illumination, in that the leading edge of the mold would be exposed to effective light before the trailing edge of the mold.

Preferably, the system 10 includes a mechanism or device for reducing the time a lens mold takes to be moved into the region of effective light. For example, the system may further comprise a "fast drag" mechanism or device effective to provide molds with substantially instantaneous illumination of the desired or optimal intensity at the start of the cure, and a substantially instantaneous termination of the light exposure at an end to the cure.

Figure 6:
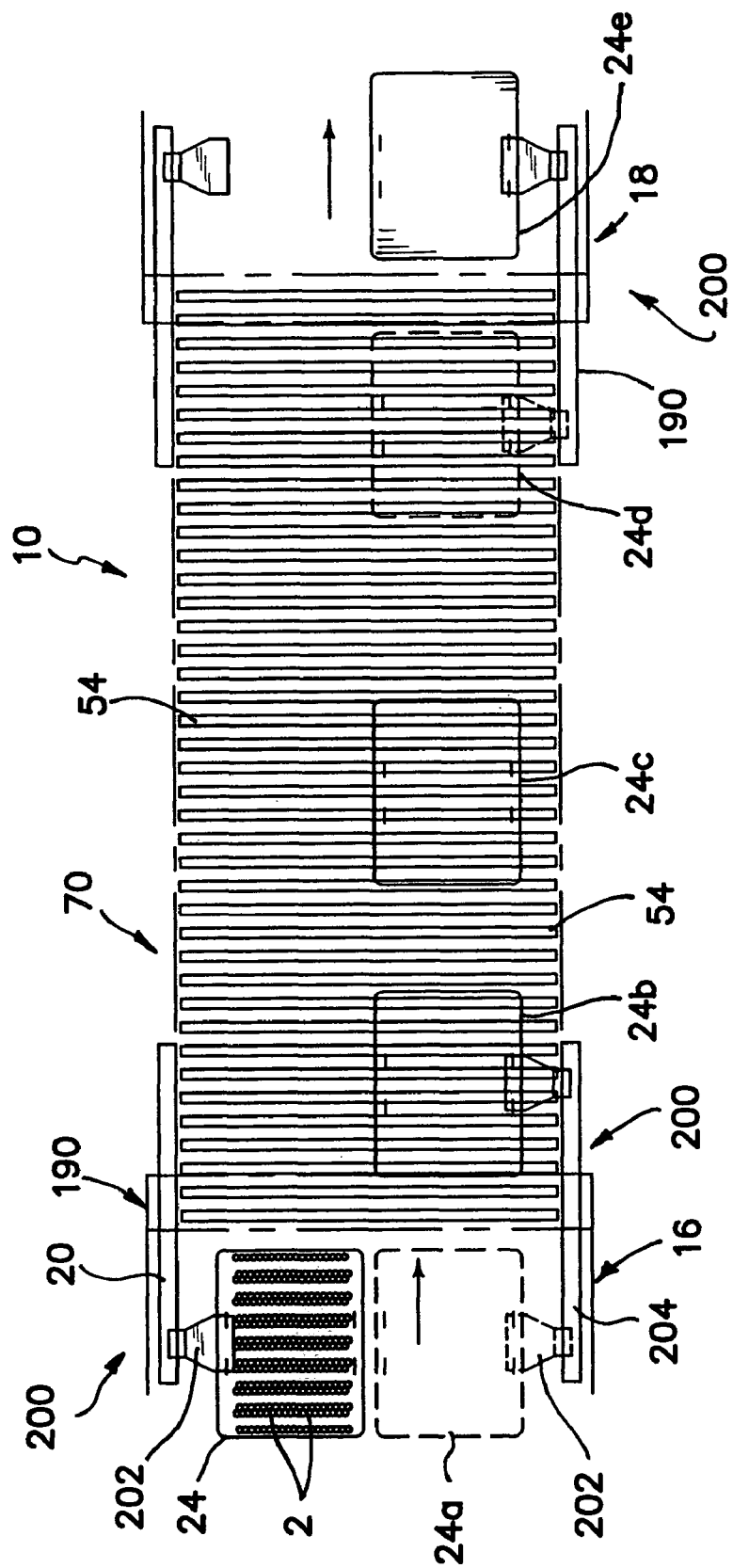
FIG. 6 is a top view of the system shown in FIG. 2, with a portion of the housing removed in order to more clearly show alignment of the ultraviolet lamps and a conveyor assembly structured to move a tray through the housing chamber and a fast-drag mechanism for at least assisting in effecting substantially instantaneous illumination of effective light to the molds.

FIG. 6 illustrates this aspect of the present systems. In order to achieve the desired "instantaneous illumination" of molds, the system 10 preferably further comprises a mechanism for controlling speed of the tray through the inlet and outlet portions of the housing chamber 14 in order to achieve the desired illumination intensity provided to the molds during the cure period.

For example system 10 may include a mechanism 200 for rapidly moving the tray 24 containing the molds, from the inlet portion 16, which preferably includes the shield structure 190, into the fully illuminated chamber. Mechanism 200 may sometimes hereinafter be referred to as the "fast-drag" mechanism.

For example, as illustrated in FIG. 6, a mold filled tray is shown at separate times as the tray moves through the system 10. The mold filled tray is represented by numerals 24*a*, 24*b*, 24*c*, 24*d* and 24*e*, which represent the mold filled tray at different points in time. The fast-drag mechanism 200 may comprise a drag arm 202 structured to grasp, clamp or otherwise temporarily engage the tray 24*a* while the tray 24*a* is located within the inlet 16 (tray 24*a* is shown being grasped by drag arm 202 in dashed line in FIG. 6). The mechanism 200 may further comprise a drag arm guide 204 structured to rapidly move the drag arm 202, and tray 24*a* engaged thereto, through the inlet portion 16 of the housing 12 and into the fully illuminated portion of the housing chamber (for example, the portion of the chamber illuminated by the $3^{rd}$ through $38^{th}$ lamps). Generally, the fast drag mechanism 200 is designed to very rapidly pull or rapidly drag a mold filled tray 24*a* from the letter-box style inlet portion 16 or a vestibule adjacent an inlet of the housing having substantially no ultraviolet radiation, into the centrally located portion of the housing chamber that is fully illuminated with the desired consistent illumination intensity.

The drag arm 202 is structured to be capable of releasing the tray 24*a* onto the conveyor belt (not shown in FIG. 6) at the moment the tray 24*b* is positioned substantially entirely within the fully illuminated portion of the housing chamber. At that point, the tray 24*b*, now released from the drag arm 202, is moved or conveyed through the fully illuminated portion of the housing chamber by means of the moving edge belt (not shown), which allows each mold on the tray 24*b* to be exposed to the full illumination of ultraviolet light for the complete cure period. The tray within the fully illuminated portion of the chamber is indicated as tray 24*b*, 24*c* and 24*d* in FIG. 6. At the end of the cure period, another fast drag mechanism 200 near the outlet 18 is used in a similar fashion to rapidly pull the tray (to position of tray 24*e*) out of the fully illuminated portion of the chamber 14 and instantaneously end the exposure to the effective light.

In a specific embodiment of the invention in which the system is designed for the manufacture of silicone hydrogel contact lenses, the conveyor assembly 70 provides for continuous, steady conveyance of the tray 24*c* though the fully illuminated chamber, for example, at a steady rate of about 3 meters per hour in order to provide a cure period having a duration of at least about 40 minutes to about 1 hour.

It is noted that in various experiments performed during development of the present systems, lenses were made after only about 20 minutes or about 30 minutes in the illuminated chamber 14. However, some of these lenses were found to have undesirably high levels of extractables or unreacted monomers, indicating that they were not fully polymerized. In a preferred embodiment, one hour is a preferred cure duration, with 40 minutes being the preferred minimum cure duration.

Other alternative or additional mechanisms may be provided by the system 10 of the present invention which address the importance of an instantaneous beginning and an instantaneous end to the cure of the composition within the molds. The fast drag mechanism 200 provides an effective means for example mechanism for accomplishing this objective in that the monomer filled molds are quickly moved from an area of substantially no polymerizing radiation (for example, in the shielded inlet portion or in the vestibule) into the fully illuminated chamber. At the end of the cure, for example, a cure having a duration of between about 30 minutes to about a one hour, the molds are rapidly removed from the fully illuminated chamber by means of the fast drag arm.

By providing a fast drag mechanism or device in the present systems, it has been discovered that certain shield components may not be required. For example, portions of the "letter box" inlet may not be required. Thus, in certain embodiments of the present systems, the upper panel of the letter box inlet, such as panel 190*a* illustrated in FIG. 7B, can be omitted and still achieve the desired polymerization of the lens precursor material.

In view of the disclosure herein, one specific embodiment of the present systems can be understood to comprise a housing and a plurality of ultraviolet lamps located in the housing. The housing comprises an inlet and an outlet. A vestibule is provided at each of the inlet and outlet of the housing. The housing also comprises a plurality of conveyor belts to move a tray of filled mold assemblies pass the ultraviolet lamps to polymerize a lens precursor composition located in the mold assemblies. The housing includes a moveable, light shielding gate between the inlet vestibule and the housing inlet, and a moveable, light shielding gate between the housing outlet and the outlet vestibule. The housing also includes a fast drag mechanism, as described herein. At the inlet and outlet of the housing, a lower panel is provided extending over the first two ultraviolet lamps in the housing, and a different lower panel is provided extending over the last two ultraviolet lamps in the housing. In this embodiment, an upper panel, such as panel 190a in FIG. 7B, is not present. The housing also comprises optical surfaces that include a central region having 0% reflectivity (e.g., a Matte Black surface), and peripheral regions having 30% reflectivity (e.g., a Matte Gray surface). Thus, this system provides the desired light shielding prior to the curing process of the lens precursor composition, provides a rapid entry and exit of trays carrying filled mold assemblies, and provides substantially uniform illumination of the mold assemblies and the lens precursor composition contained therein to produce contact lens products of acceptable quality.

Figure 8A:
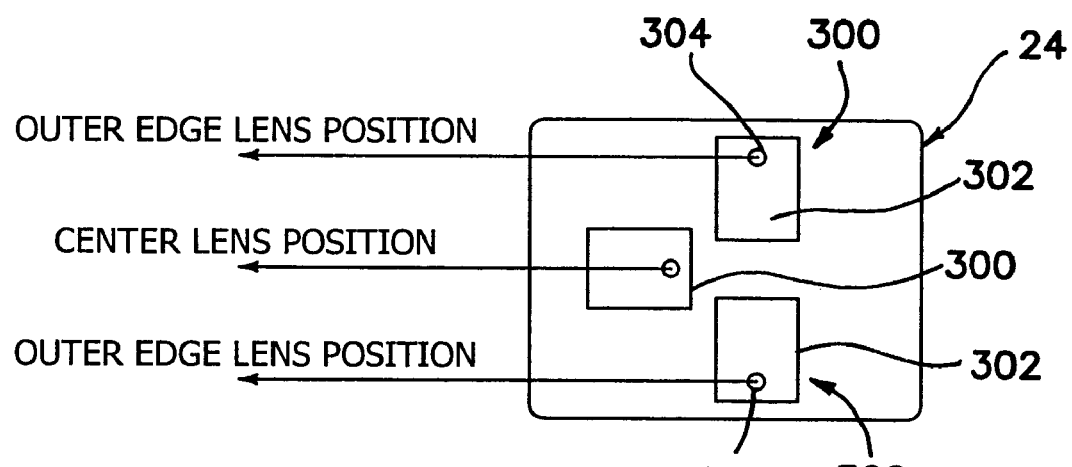
FIG. 8A shows a top plan view of an arrangement of light sensors useful for measuring and/or monitoring intensity of light in the systems of the invention during processing of lenses.

Turning now to FIG. 8A, another advantageous feature of the present invention is shown which is useful for monitoring system 10 for quality control purposes, for example. More particularly, the systems 10 of the present invention may comprise means for measuring and/or monitoring light intensity, for purposes of validating and/or mapping light intensity at various locations or positions within the chamber 14.

For example, at least one, preferably a plurality of, sensor devices 300, suitable for being moved through the system housing are provided. The sensor device or devices 300 may comprise a remote data logger 302 having a sensor window 304 for sensing and recording, for example logging, intensity of light provided to the sensor device 300 through the sensor window 304.

For example, each sensor device 300 may comprise an integrating radiometer, or other technology known to those of skill in the art, suitable for sensing, recording and logging light intensity values.

Advantageously, the sensor devices 300 are sized and structured to be positionable within the housing chamber and moved therethrough. More particularly, the data loggers 302 are structured so that they can be moved through the system during processing of lenses.

For example, as shown in FIG. 8A, three data loggers 302 are shown positioned on tray 24, which is identical to the trays used to hold and move the filled molds through the illuminated chamber. In the arrangement shown, one sensor 304 is being used to monitor one of each of the edge positions and one sensor 304 is being used to monitor an intermediate position on the tray 24.

The data loggers 302 are sized and structured so as to enable three of such data loggers 302 to be placed on a single tray 24, such as shown in FIG. 8A. For example, each data logger 302 has a thickness of about 20 mm, a length of 160 mm, and a width of about 100 mm.

Figure 8B:
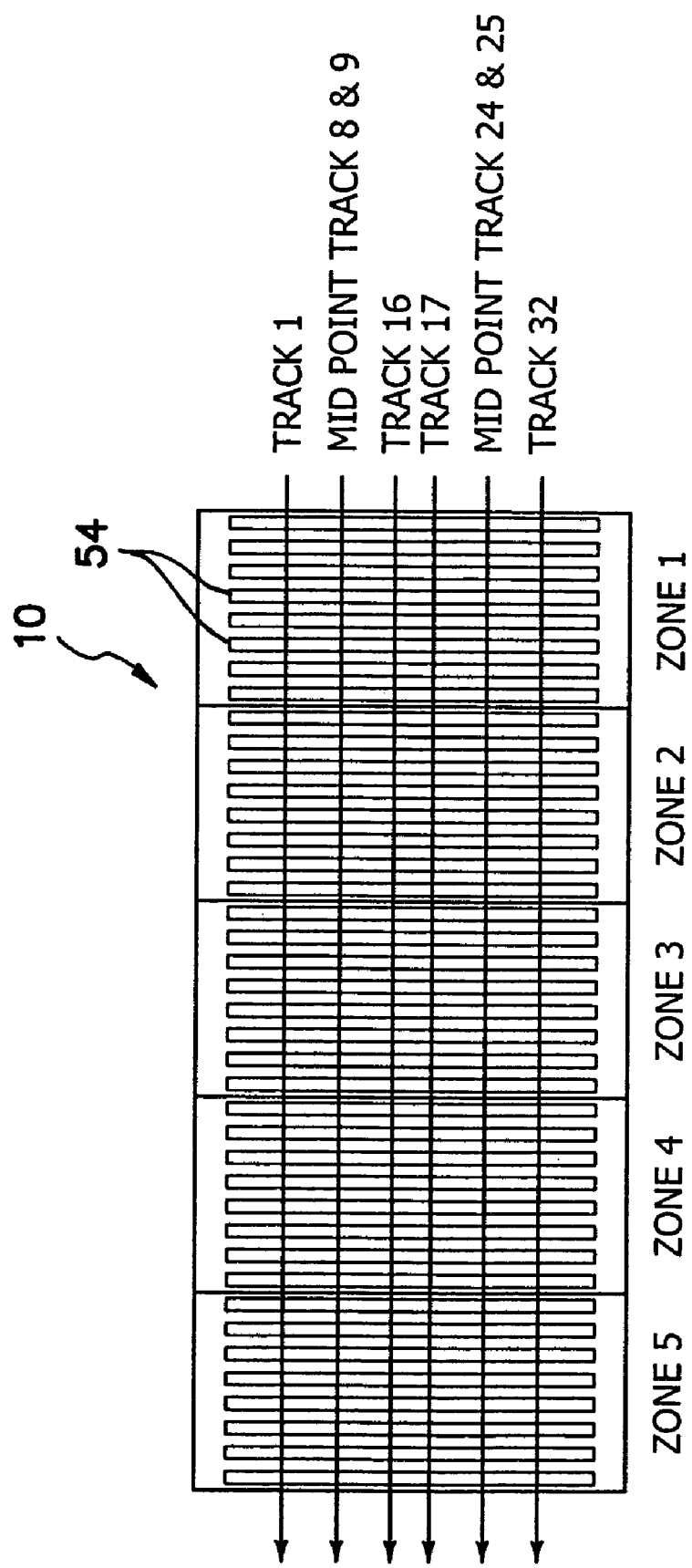
FIG. 8B shows a diagrammatical view of multiple tracks monitored by the light sensor arrangement shown in FIG. 8A.

Turning now to FIG. 8B, a diagram is shown of an eighty (80) lamp system 10 in accordance with the invention described and shown elsewhere herein (for example, in FIG. 6). This diagrammatical view illustrates an effective means of monitoring a plurality of positions in the illuminated chamber using the sensor devices 300 positioned on tray 24, for example, as shown in FIG. 8A. In FIG. 8B, each "track" of which a filled contact lens mold moves through the system can be traced by a sensor window 304 of a data logger 302 appropriately placed. Each track represents a position of a mold passing through the illuminated chamber.

The use of the sensor devices can be described as follows. A system, such as system 10 described and shown elsewhere herein, is provided for manufacturing contact lenses using ultraviolet light. A single contact lens mold takes one hour to pass through the housing of the system.

Six sensor devices, or data loggers 302, are arranged as shown in FIG. 8A on two mold trays, three data loggers to each tray. Contact lens molds (not shown) may also be placed on the trays along with the sensor devices if desired. Alternatively, the data loggers can be provided on their own tray free of contact lens mold assemblies, and the data logger containing trays can pass through the system while trays containing filled contact lens mold assemblies are also passing through the system. For example, during the lens manufacturing process, two of the trays that normally would carry contact lens molds through the housing chamber, are replaced with the two trays each holding the three data loggers. The two trays holding the data loggers are passed into the housing chamber, along with trays holding lens molds, and are moved through the housing chamber by means of the conveyor.

During the one hour time period that a single data logger takes to move through the system, the sensor window of the data logger senses and records 65, 536 values of light intensity. After the data logger leaves the chamber, it is then connected to a computer. The 65, 536 values are downloaded into a software package and displayed on a computer screen, for example, in graph form. A technician can analyze the data and confirms that the ultraviolet light intensity inside the housing is (or is not) at the desired level through a full cure cycle at a given mold position.

In some embodiments of the invention, using the data loggers is preferable to using fiber optic sensors and spectrometers as described elsewhere herein for monitoring light in the system. For example, the remote data loggers are generally less expensive than fiber optic sensors. It should be appreciated that a combination of fiber optic sensors/spectrometers and data loggers may be provided in a system in accordance with the present invention.

It is contemplated that the effectiveness of the sensor devices (e.g. data loggers) as described herein, may be enhanced by provision of any one or more of the following: wireless real time communication upgrades, networking nodes, and enhancements to data processing capability. These sensor devices can be used as a part of an intelligent network. Other advantageous additions, modifications and alternative arrangements may be provided for enhancing control and monitoring capabilities in accordance with other embodiments of the invention.

In another aspect of the invention, means are provided for detecting failure of individual light sources. For example, in the specific embodiment of the invention shown in FIG. 6 and described in detail elsewhere herein, it is important for an operator of the system 10 be aware and to know with some degree of certainty, that all of the 80 lamps of the system 10 are properly functioning during the curing of the lenses. If any one of the lamps are non-functioning, it is possible or likely that the contact lenses manufactured within the system 10 may not experience the most effective cure. It is therefore desirable for the system 10 to include an effective and reliable control system that can readily identify if one or more individual lamps has failed to operate.

Preferably, control of the lamps in the system of the invention is provided by a control assembly comprising an electronically controlled lamp failure detection mechanism. Preferably, the control assembly includes components which can be implemented into the system at relatively low cost and complexity. A lamp error feedback solution control assembly is preferred over more expensive, more complex and/or less reliable control means, for example, mechanisms that would utilize radiometric sensors or fiber optic sensors.

More specifically, for example, lamp error feedback can be implemented into the system of the present invention by connecting a pair of fluorescent ultra violet lamps to a digital high frequency electronic ballast and making use of digital addressable lighting interface protocol (in the lighting industry this is commonly referred to as DALI protocol). It is believed that DALI protocol has not previously been implemented in any system utilizing ultraviolet light to effect polymerization of monomers. However, DALI protocol-based technology is well known, and thus will not be described in great detail herein. For example, DALI protocol-based technology is conventionally implemented in lighting systems that control visible lamps in modern buildings.

The implementation of DALI protocol-based technology into the systems of the present invention is utilized in conjunction with digital high frequency electronic ballasts. The DALI protocol will not communicate with analogue ballasts. Means for controlling the ultraviolet light sources in the systems of the present invention therefore, preferably includes digital ballasts, for example, digital, high frequency electronic ballasts connected to the lamps rather than analog ballasts. Modern digital electronic ballasts perform the basic function of ballasting a fluorescent lamp significantly better than analog ballasts in terms of power factor, efficiency, and the like. For example, the digital ballast gives off less heat compared to an equivalent analog ballast.

For example, the electronic ballast may include a rectifier for changing the alternating current (AC) from a power line into direct current (DC) and an inverter for changing the direct current into alternating current at high frequency, typically 25-60 kHz. Some electronic ballasts include a boost circuit located between the rectifier and the inverter.

Generally, methods of lighting control in accordance with some embodiments of the present invention involve using digital control signals, preferably DALI protocol based technology, to control the electronic ballasts, controllers and/or sensors belonging to the system of the invention. In some embodiments of the invention, each component of the lamp control and lamp failure detection system has its own device-specific address, and this makes it possible to implement individual device control.

Figure 9:
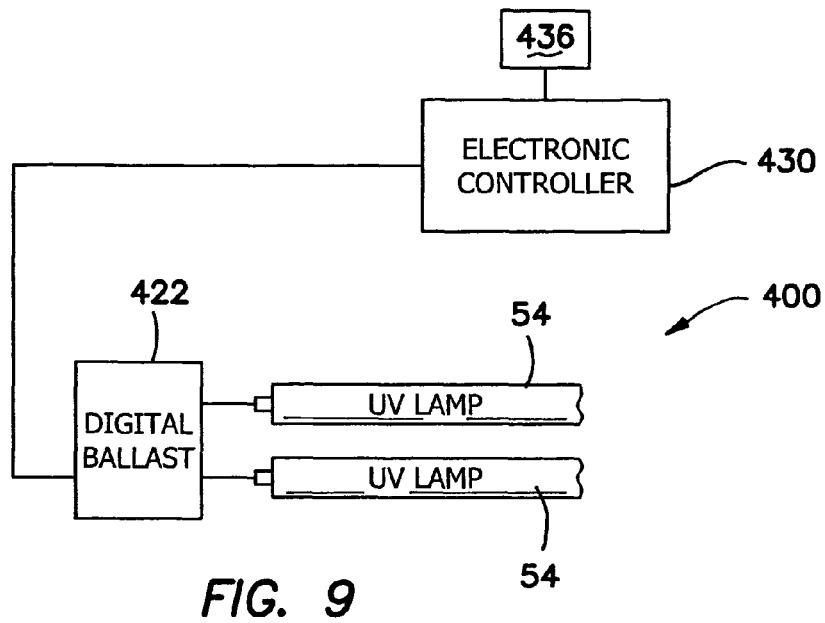
FIG. 9 shows a diagram of a preferred lighting control system utilizing DALI protocol-based technology in accordance with the present invention.

For example, as shown in a simplified diagram in FIG. 9, in accordance with a preferred embodiment of the invention, a control assembly 400 is provided which utilizes a digital ballast 422 connected to a pair of lamps 54. The digital ballast 422 is connected to an electronic controller 430. The control assembly is designed such that if one of the ultraviolet lamps 54 turns off, for example, due to lamp failure or a poor electrical connection, the digital ballast 422 will send an error message to the electronic controller 430 using the DALI protocol. The electronic controller 430 receives the signal and causes an alarm (not shown) to sound, and provides indication as to which of the lamps has failed. An operator can then take corrective action. For example, the action to be taken may include rejecting the contact lenses that passed through the system 10 at the time of the lamp failure. The operator can then change the faulty lamp or fix the faulty connection.

In a specific embodiment of the invention, each of the ultraviolet lamps 54 comprises a Philips TL40 W/05 ultraviolet fluorescent lamp, or a lamp having properties similar thereto. Each of the lamps 54 is connected to a Tridonic PCA 2/36 EXCEL 220-240V 50/60/0 Hz digital high frequency ballast 422.

The electronic controller 430 may include DALI protocol-based software embedded in a Beckhoff BC9000 programmable logic controller. The DALI protocol-based technology, useful in the systems and methods of the present invention, is available from Hayes Control Systems Ltd, The Boathouse, Henley-on-Thames, Oxon RG9 1AZ, United Kingdom, and Marlin Automated Manufacturing Systems, Marlin House, Johnson Road, Fernside Park, Wimborne, Dorset BH21 7SE, United Kingdom.

It is noted that in addition to the identification of individual lamp failure, the control assembly 400 described hereinabove is preferably also configured to control lamp intensity. This may be accomplished by adding ultraviolet sensors, for example about ten ultraviolet sensors to the 80 lamp system described in detail herein. The sensors may be UVA type sensors. The supply voltage may be 24 volts, with the output voltage being about 0 to 10 volts. The output from the sensors may be used to control the lamp intensity through the hardware components described herein with reference to the DALI protocol. The sensors may be provided adjacent one or more of the ultraviolet lamps. In certain embodiments, the sensors are sensing the ultraviolet light during exposure of the filled mold assemblies to the ultraviolet light. For example, the monitoring and measuring of UV intensity is occurring simultaneously with the mold exposure to the UV light. In other embodiments, the sensors do not sense or monitor the ultraviolet light while the filled mold assemblies are exposed to the light. Instead, the sensors can monitor the light when the housing is free of mold assemblies undergoing the curing process.

Figure 10:
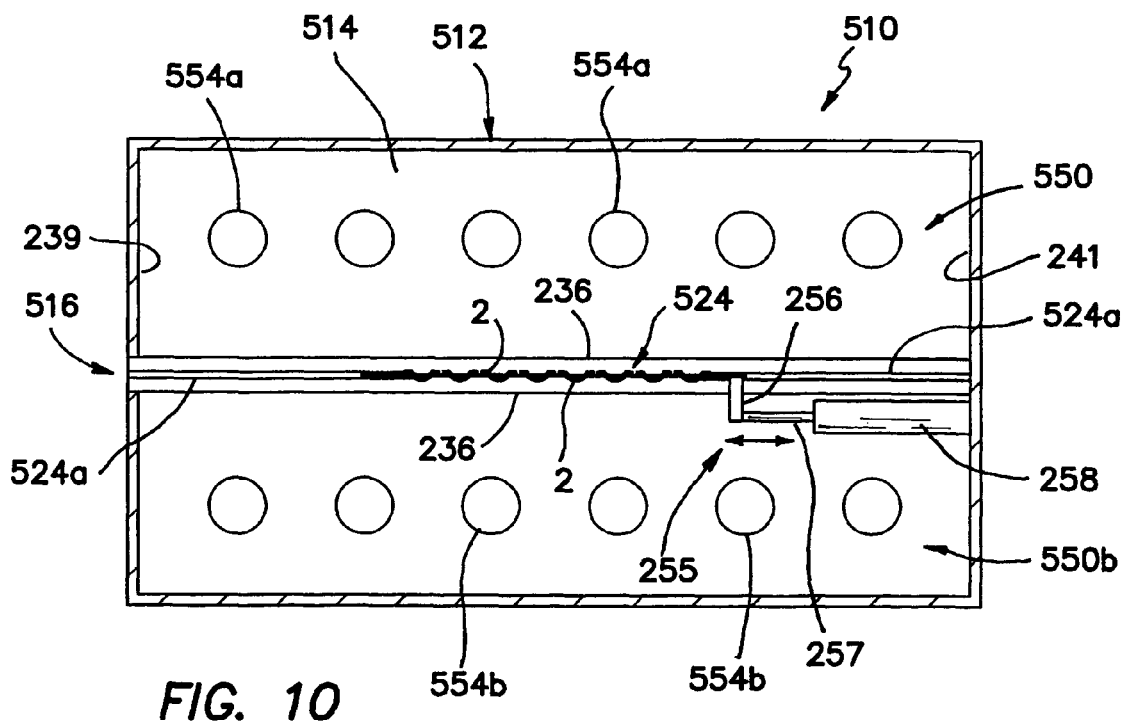
FIG. 10 shows a cross-sectional view of another system of the present invention.

FIG. 10 shows yet another system in accordance with the invention, generally at 510. Except as expressly described herein, system 510 is similar to system 10 and features of system 510 which correspond to features of system 10 are designated by the corresponding reference numerals increased by 500.

System 510 is substantially the same as apparatus 10, with the primary difference being that system 510 includes no conveyor system for transporting the molds 2 through the housing 512 during the cure period. In other words, rather than the molds 2 moving through the housing 512 during the polymerization process or cure period, the molds in system 510 remain relatively substantially stationary, or relatively substantially static, during the polymerization process or cure period. For this reason, system 510 is sometimes referred to herein as a "static light box" system.

System 510 comprises a housing 512 having an opening 516 for receiving a tray 524 filled with molds 2, a first light source 550*a* comprising, for example, six ultraviolet lamps 554*a* and a second light source 550*b* comprising, for example, six ultraviolet lamps 554*b*. The system 510 further comprises structure, for example, tray guides, for example, slotted tray guides 236, positioned along inner sidewalls of the housing 512 and structured to support the tray 524 and molds carried therein, in a position between the first light source 550*a* and the second light source 550*b*.

The system 510 is structured such that during the cure period, each of the molding assemblies 2 held by the tray 524 is positioned substantially directly between the centrally located light emitting elements 554*a* and 554*b*. Each of the filled molds 2 on the tray 524 is preferably positioned substantially directly in the center of the housing 512. For example, in the twelve lamp arrangement shown, each of the molds 2 are positioned beneath and above the 3rd and 4th lamps in the first and second light sources 550*a* and 550*b*, respectively.

The molds 2 are preferably grouped together near a middle region of the tray 524 where the light intensity is substantially uniform. For example, in the static light box system 510 shown, the peripheral regions 524*a* of the tray 524 hold no molds.

Use of the system 510 for manufacturing ophthalmic lenses from a polymerizable composition may include the steps of illuminating the housing chamber 512 by activating the lamps 554a and 554b, and placing a mold-filled tray 524 into an opening 516 so that the tray 524 is engaged within the tray guides 236.

Preferably, because of the highly sensitive nature of some of the polymerizable compositions used in the systems of the invention, the step of placing the mold-filled tray 524 into the housing 512 is accomplished very quickly, preferably as close to instantaneously as possible, in order to achieve substantially instantaneous illumination of each of the molds 2. For example, the tray 524 can be moved very quickly into position by sliding it along the tray guides 236. The tray 524 may be left to remain substantially static in the housing chamber 514, between the first light source 550a and the second light source 550b for the duration of the cure. To end the cure, the tray 524 is rapidly drawn out of the housing 512 through the opening 516.

Although not specifically shown, it should be appreciated that rather than having a single opening 516 that functions as both an inlet and outlet, the system 510 may, in other embodiments of the invention, comprise a distinct inlet opening for receiving the tray 524 into the housing 512 and a distinct outlet opening for passing the tray 524 out of the housing 512.

In a preferred embodiment, the tray 524 is simply manually placed, for example, slid, into the housing 512 through the opening 516 and when the polymerization of the lenses is complete, the tray is manually retrieved from the housing 512 though the opening 516.

In some embodiments, an engagement mechanism 255 is provided. The engagement mechanism 255 is structured to be effective to contact or engage, and move, for example, oscillate, the tray 524 during the cure period. Engagement mechanism 255 may include a grip mechanism 256 structured to be releasably coupled to tray 524. The engagement mechanism 255 may include an arm 257, for example coupled to the grip mechanism 256. The arm 257 may be coupled to a damped pneumatic cylinder 258. The engagement mechanism 255 may be driven by a motor (not shown) to move, for example, oscillate, the tray 524 in a desired fashion to achieve the most effective cure.

When low intensities of light are used to cure the polymerizable compositions, as will be appreciated from the description of other embodiments of the invention elsewhere herein, the step of placing the tray 524 into the housing 512 is preferably accomplished very quickly, preferably as close to instantaneously as possible. The system 510 is structured to facilitate moving the tray 524 into and/or out of the system 510 as quickly as possible. In a specific embodiment of the invention, system 510 is structured to be effective to enable processing in the system 510 of about 64 lenses per hour.

In some embodiments, one or more mechanisms may be provided for automatically drawing tray 524 into the chamber 514 and/or out from the chamber 514. For example, engagement mechanism 255 may be useful to draw the tray 524 into the chamber and/or push the tray out of the chamber 514, and/or to gently move, for example, oscillate the tray back and forth within the chamber 514 during the cure period, if oscillation is deemed to be beneficial. In other embodiments of the invention, separate mechanisms may be employed for drawing the tray 124 into and/or out of the illuminated chamber and for oscillating the tray 124.

During the cure period, the molds 2 are all positioned generally between the centrally located lamps and in the fully illuminated region of the housing chamber 514. The polymerizable composition in the molds 2 is then allowed to polymerize for a specified, desired cure period. At the end of the cure period, the tray 524 and molds 2 carried therein are retrieved, manually or automatically, from the system 510 for subjection to further processing steps.

Figure 11:
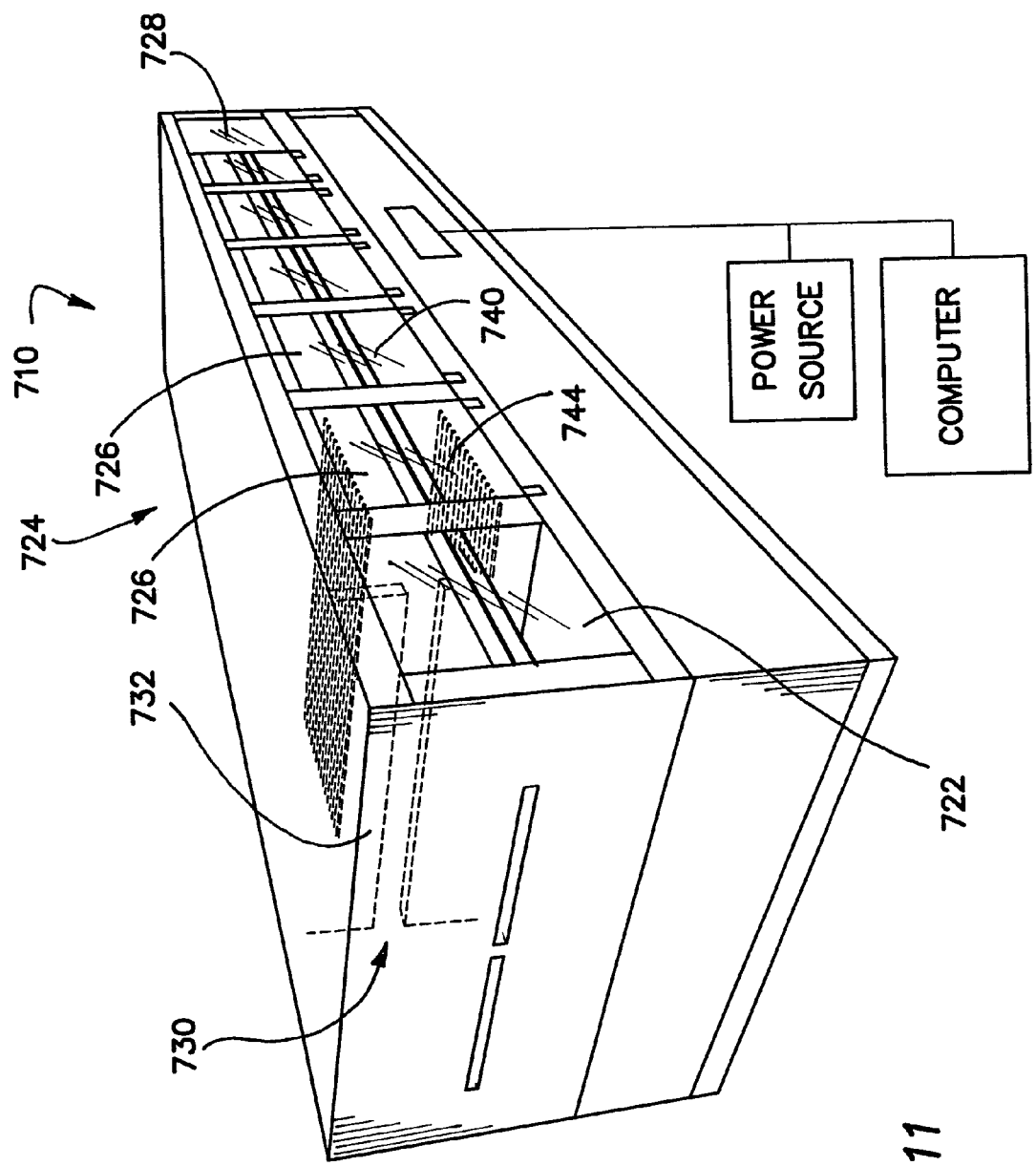
FIG. 11 is a perspective view of another embodiment of the present systems.

Turning now to FIG. 11, a system 710 for manufacturing contact lenses in accordance with the invention is shown. This example is provided in order to provide a general overview of a system in accordance with the invention that includes many of the different features described hereinabove.

In this embodiment, the system 710 is somewhat modular in form. The modular form of this embodiment facilitates maintenance of the system. The system 710 includes two side-by-side "lanes" for simultaneously processing side-by side trays of molds, such as shown in FIG. 2.

System 710 includes an entrance vestibule 722, a light tunnel assembly 724 comprising five light "stations" 726, and an exit vestibule 728. In another embodiment, the system comprises six light stations 726.

Each of the two vestibules 722, 728 generally comprises a UV guarded chamber structured to contain a mold filled tray in a substantially UV free location, both prior to and after the polymerizing process which takes place in the light tunnel 724. Between the exit of the entrance vestibule 722 and the first station 726, a UV light shield 730 is provided for preventing polymerizing amounts of UV light from entering the vestibule 722 and polymerizing the lens precursor composition contained in the molds. The shield 730 comprises a pneumatic gate 732 that moves generally up and down or vertically to allow the tray to pass from the vestibule 722 to the first light station 726. The exit vestibule 728 is substantially identical to the inlet vestibule 726. The exit vestibule 728 includes a light shield (not shown) comprising a pneumatic gate that is located between the sixth light station and the inlet to the vestibule 728. Additional details regarding structural features and purposes of the UV blocking vestibules are provided elsewhere herein. The vestibules include a UV blocking or filtering material so that the lens precursor compositions contained in the molds on the tray are not prematurely polymerized by ambient UV light present in the environment in which the system is placed. The light shield, such as the gate, helps prevent premature polymerization of the lens precursor composition by ambient light passing from the curing chamber of the housing.

The light stations 726 may be substantially identical to one another and are structured to be interconnected to define the length of the light tunnel assembly 724.

Each light station 726 includes a housing 740 containing an upper light frame assembly 744 holding eight UV lamps, and a substantially opposing lower light frame assembly 746 holding eight UV lamps. Each UV lamp may be a florescent bulb capable of delivering up to about 2000 $\mu W/cm^2$.

A conveyor system such as described and shown elsewhere herein is located within the light tunnel assembly 724 and is structured to move the mold filled trays between the entrance vestibule 722 to the exit vestibule 728. The conveyor assembly is designed to allow molds carried in the tray to be illuminated from both above and below with a substantially consistent intensity of UV light.

Each pair of lamps is connected to an electronic ballast (not shown) mounted to a back side of the station housing. The ballasts are each connected to a controller 756 and a power source 758. The controller is a computer which receives input from the electronic ballasts. DALI based protocol technology is used to detect failure of any of the lamps and is used to set light intensity from the lamps.

The interior surfaces of the housing of the light stations are structured to provide an "optical surface" effective to reflect and diffuse light in order to maintain the desired consistent, uniform illumination to the molds in the trays as the trays pass through the light stations. The optical surfaces comprise an advantageous combination and arrangement of reflective surfaces and non-reflective surfaces. Additional detail regarding the optical surfaces is provided elsewhere herein.

The moving belts of the conveyor system extend a short distance, for example about 6 inches, into the entrance vestibule and about 6 inches into the exit vestibule. The conveyor system is supported by a plurality of carefully placed supports which are configured and positioned to support the conveyor belts without casting significant shadows onto the mold filled trays carried by the conveyor. Running along the center of the conveyor system is a center support having cantilevered portions alternating from the left of the support and the right of the support to provide balance to the center support. The support assembly is described in greater detail elsewhere herein.

In use, a mold filled tray 24 containing 256 molds (arranged as shown in FIG. 2) is inserted into the entrance vestibule 722. When ready to enter the first light station, for example, when sufficient space is available on the conveyor within the first station, the pneumatic gate is opened. Pins, such as retractable pins, of a fast drag arm engage apertures along the outermost side of the tray. The arm rapidly pulls the tray into the first light station where it is placed on the conveyor and the pins retract and disengage from the tray. Movement of the tray from the vestibule to the conveyer takes about fifteen seconds. The fast drag arm returns to the entrance vestibule and the pneumatic gate closes. The fast drag mechanism is not shown in FIG. 11, but details of a fast drag mechanism are provided elsewhere herein, and shown, for example, in FIG. 6.

The tray in the first light station is conveyed to the next station. When moving through the light stations, the tray slowly moves past each lamp of each station. The tray spends a total time of about one hour moving from the entrance to the first light station to the exit of the sixth light station. The molds on the tray are illuminated with a UV intensity of about 340 µW/cm$^2$. At the end of the sixth light station, the pneumatic gate of the exit vestibule opens, the fast drag arm engages the tray and the tray is rapidly pulled into the vestibule. The fast drag arms disengage the tray and return to the sixth light station. The pneumatic gate closes. The tray can now be removed from the system for post processing steps, such as demolding, peeling, extraction and hydration, and lens packaging.

With the arrangement shown in FIG. 11, new mold filled trays can be fed into the system 710 through the entrance vestibule at a rate of about two side-by-side mold filled trays about every ten minutes, or if staggered, one mold filled tray per lane about every 5 minutes.

For example, the trays are placed on each lane in a staggered fashion so that one tray will be available for pickup from the exit vestibule at any given time.

The light stations can hold 12 trays (i.e. two trays in each of the six light stations) and each of the vestibules can hold two trays.

Additional embodiments of the present systems can use other light shield devices. For example, systems may comprise any element that can block or filter a major portion of UV light that might cause premature exposure and polymerization of the lens precursor composition in the mold assemblies. The element or elements should be moveable so as to not interfere with placement of the mold assemblies in the housing or curing chamber. As one additional example, a light shield may be provided that rotates about an axis to open and close and provide access to the curing chamber. As another example, a flexible curtain or curtains could be used to provide a light barrier to the curing chamber.

Thus, the present systems and methods are effective in polymerizing lens precursor compositions present in mold assemblies by exposing the lens precursor compositions to substantially constant and uniform light intensity during the entire curing process. The light intensity can vary, as discussed herein. For example, the light intensity can vary by about 5% to about 30% relative to a mean or average light intensity value, depending on the particular mean or average light intensity being utilized.

Certain aspects and advantages of the present invention may be more clearly understood and/or appreciated with reference to the following commonly owned United States Patent Applications, filed on even date herewith, the disclosure of each of which is being incorporated herein in its entirety by this specific reference: U.S. patent application Ser. No. 11/200,848, entitled "Contact Lens Molds and Systems and Methods for Producing Same"; U.S. patent application Ser. No. 11/200,648, entitled "Contact Lens Mold Assemblies and Systems and Methods of Producing Same"; U.S. patent application Ser. No. 11/201,410, entitled "Systems and Methods for Removing Lenses from Lens Molds"; U.S. patent application Ser. No. 11/200,863, entitled "Contact Lens Extraction/Hydration Systems and Methods of Reprocessing Fluids Used Therein"; U.S. patent application Ser. No. 11/200,862, entitled "Contact Lens Package"; U.S. Patent Application No. 60/707,029, entitled "Compositions and Methods for Producing Silicone Hydrogel Contact Lenses"; and U.S. patent application Ser. No. 11/201,409, entitled "Systems and Methods for Producing Silicone Hydrogel Contact Lenses".

A number of publications and patents have been cited hereinabove. Each of the cited publications and patents are hereby incorporated by reference in their entireties.

While this invention has been described with respect to various specific examples and embodiments, it is to be understood that the invention is not limited thereto and that it can be variously practiced within the scope of the following claims.

What is claimed is:

1. A system for producing silicone hydrogel contact lenses from a polymerizable composition, the system comprising:
   a housing defining a chamber having an inlet portion and an outlet portion, and a length extending from the inlet portion to the outlet portion;
   a carrier movable in the chamber between the inlet portion and the outlet portion, the carrier being configured to carry a plurality of contact lens mold assemblies;
   a plurality of contact lens mold assemblies containing a polymerizable silicone hydrogel contact lens precursor composition provided on the carrier, each contact lens mold assembly comprises a front surface mold section and a back surface mold section assembled together to provide a concave lens forming surface and a convex lens forming surface;
   a first light source located in the housing spaced apart from and generally facing a first side of the carrier for providing light effective to facilitate polymerization of the polymerizable composition in the plurality of contact lens mold assemblies;
   a second light source located in the housing spaced apart from and generally facing a substantially opposing second side of the carrier for providing light effective to facilitate polymerization of the polymerizable composition in the plurality of contact lens mold assemblies;
   a first optical surface spaced apart from the plurality of contact lens mold assemblies and positioned in the housing to provide a substantially uniform intensity of light from the first light source over the contact lens mold assemblies positioned substantially perpendicular to the length of the chamber;

a second optical surface spaced apart from the plurality of contact lens mold assemblies and positioned in the housing to provide a substantially uniform intensity of light from the second light source over the contact lens mold assemblies positioned substantially perpendicular to the length of the chamber and wherein the first optical surface and the second optical surface each comprises a substantially planar surface extending across contact lens mold assemblies provided on the carrier substantially perpendicular to the length of the chamber and extending across contact lens mold assemblies provided on the carrier substantially parallel to the length of the chamber; and the carrier being configured to allow each of the plurality of contact lens mold assemblies provided on the carrier to be exposed to light from both the first light source and the second light source.

2. The system of claim 1 wherein the carrier includes a plurality of through holes, each of the through holes being sized and configured to allow one of the plurality of contact lens mold assemblies provided on the carrier to be seated therein.

3. The system of claim 1 further comprising a conveyor assembly structured to move the carrier through the chamber.

4. The system of claim 1 wherein the inlet portion of the housing is structured to shield the carrier from receiving effective light when the carrier is located in the inlet portion.

5. The system of claim 4 wherein the inlet portion comprises an enclosable vestibule.

6. The system of claim 1 structured to provide light to the carrier at an intensity in a range of about 100 μW/cm² to about 2000 μW/cm² when measured using a Spectronics digital radiometer DRC-100X with DIX 365A sensor.

7. A system for producing silicone hydrogel contact lenses from a polymerizable composition, the system comprising:

a housing defining a chamber having an inlet portion and an outlet portion, and a length extending from the inlet portion to the outlet portion;

a carrier received in the housing chamber, the carrier being configured to carry a plurality of contact lens mold assemblies;

a plurality of contact lens mold assemblies containing a polymerizable silicone hydrogel contact lens precursor composition provided on the carrier;

a light assembly located in the housing and structured to provide light effective to facilitate polymerization of the polymerizable composition in the plurality of contact lens mold assemblies, the light assembly comprising a plurality of elongated light emitting tubes extending substantially perpendicular to the length of the chamber; and an optical surface assembly spaced apart from the plurality of contact lens mold assemblies and comprising at least one substantially planar surface extending across contact lens mold assemblies provided on the carrier substantially perpendicular to the length of the chamber and extending across contact lens mold assemblies provided on the carrier substantially parallel to the length of the chamber, the optical surface assembly being effective to provide a substantially uniform intensity of light from the light assembly over the plurality of contact lens mold assemblies provided on the carrier.

8. The system of claim 7 further comprising a conveyor assembly structured to move the carrier through the chamber.

9. The system of claim 7 structured to provide at least one of substantially instantaneous initiation and substantially instantaneous termination of effective light provided to the contact lens mold assemblies upon the contact lens mold assemblies entering and exiting the housing chamber.

10. The system of claim 7 wherein the carrier includes a plurality of through holes, each of the through holes being sized and configured to allow one of the plurality of contact lens mold assemblies provided on the carrier to be seated therein and to be exposed to light to which two substantially opposing sides of the carrier is exposed.

11. The system of claim 8 wherein the conveyor assembly comprises a mechanism structured to automatically move the carrier into the chamber and out of the chamber.

12. The system of claim 7 wherein the inlet portion of the housing is structured to shield the carrier from receiving effective light when the carrier is located in the inlet portion.

13. The system of claim 4 wherein the inlet portion comprises an enclosable vestibule.

14. The system of claim 8 structured to provide light to the carrier at an intensity in a range of about 100 μW/cm² to about 2000 μW/cm² when measured using a Spectronics digital radiometer DRC-100X with DIX 365A sensor.

15. The system of claim 1 wherein the first optical surface and the second optical surface each comprises a reflective element.

16. The system of claim 1 wherein the first light source and the second light source each comprise a plurality of elongated light emitting tubes positioned substantially perpendicular to the length of the chamber.

17. The system of claim 16 wherein the plurality of elongated light emitting tubes emit ultraviolet light.

18. The system of claim 7 wherein the plurality of elongated light emitting tubes are positioned above and below the plurality of contact lens mold assemblies provided on the carrier.

19. The system of claim 7 wherein the plurality of elongated light emitting tubes emit ultraviolet light.

20. The system of claim 7 wherein the at least one substantially planar surface comprises a reflective element.

21. The system of claim 7 wherein the at least one substantially planar surface comprises a first substantially planar surface above the plurality of contact lens mold assemblies provided on the carrier and a second substantially planar surface below the plurality of contact lens mold assemblies provided on the carrier.

* * * * *

UNITED STATES PATENT AND TRADEMARK OFFICE
CERTIFICATE OF CORRECTION

| | | |
|---|---|---|
| PATENT NO. | : 7,785,092 B2 | Page 1 of 1 |
| APPLICATION NO. | : 11/200644 | |
| DATED | : August 31, 2010 | |
| INVENTOR(S) | : Richard C. Rogers | |

It is certified that error appears in the above-identified patent and that said Letters Patent is hereby corrected as shown below:

<u>Column 27</u>
Line 6, "system lob" should read --system 10b--.

Signed and Sealed this
Fifth Day of July, 2011

David J. Kappos
*Director of the United States Patent and Trademark Office*